United States Patent
Hayslett et al.

(10) Patent No.: US 11,392,756 B2
(45) Date of Patent: *Jul. 19, 2022

(54) SYSTEMS AND METHODS TO IMPROVE A TECHNOLOGICAL PROCESS FOR SIGNING DOCUMENTS

(71) Applicant: DocuSign, Inc., San Francisco, CA (US)

(72) Inventors: Lauren Hayslett, San Francisco, CA (US); Stephen Parish, Seattle, WA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,779

(22) Filed: Aug. 10, 2020

(65) Prior Publication Data

US 2020/0372202 A1 Nov. 26, 2020

Related U.S. Application Data

(63) Continuation of application No. 16/372,844, filed on Apr. 2, 2019, now Pat. No. 10,776,563.

(Continued)

(51) Int. Cl.
*G06F 40/143* (2020.01)
*G06F 40/205* (2020.01)
(Continued)

(52) U.S. Cl.
CPC .......... *G06F 40/143* (2020.01); *G06F 40/117* (2020.01); *G06F 40/205* (2020.01); *H04L 9/3247* (2013.01); *H04L 2209/60* (2013.01)

(58) Field of Classification Search
CPC .................................................... G06F 40/143
See application file for complete search history.

(56) References Cited

U.S. PATENT DOCUMENTS

2006/0288269 A1 12/2006 Oppenlander et al.
2007/0066352 A1* 3/2007 Silverbrook et al. .... H04Q 7/32
(Continued)

OTHER PUBLICATIONS

Haralick, Robert M., "Document Image Understanding: Geometric and Logical Layout," 1994, IEEE, pp. 385-390 (Year: 1994).
(Continued)

*Primary Examiner* — James J Debrow
(74) *Attorney, Agent, or Firm* — Fenwick & West LLP

(57) ABSTRACT

Systems and methods to improve a technological process for signing documents are described. The system accesses a portable document format (PDF) file and a first signature tag marker element (STME) to parse the PDF to generate logical text block elements (LTBE). The LTBEs describe original document elements in the PDF including a first LTBE. The system sorts each LTBE against the first STME to pair the first LTBE with the first STME based on proximity. The system generates markup language information (MLI) for utilization at the client device (CD) for rendering a responsive markup language image (RMLI) in a responsive format and communicates the MLI to a CD for rendering the RMLI on the CD. The system receives the signing information from the CD causing the signing information to be associated with the first signature tag marker identifier and communicates the PDF and the signing information to the CD.

20 Claims, 16 Drawing Sheets

Related U.S. Application Data

(60) Provisional application No. 62/652,744, filed on Apr. 4, 2018.

(51) Int. Cl.
*H04L 9/32* (2006.01)
*G06F 40/117* (2020.01)

(56) References Cited

U.S. PATENT DOCUMENTS

| | | | |
|---|---|---|---|
| 2010/0161693 A1* | 6/2010 | Lee | G06F 17/30 |
| 2012/0102388 A1 | 4/2012 | Fan | |
| 2013/0114914 A1* | 5/2013 | Dejean | G06K 9/20 |
| 2013/0335541 A1* | 12/2013 | Hernandez | H04N 7/18 |
| 2014/0063048 A1* | 3/2014 | Somerfield et al. | G09G 5/00 |
| 2015/0172151 A1 | 6/2015 | Bottalico et al. | |
| 2016/0179776 A1* | 6/2016 | Bartley et al. | G06F 17/24 |
| 2017/0068743 A1 | 3/2017 | Kumar et al. | |
| 2018/0285332 A1* | 10/2018 | Aghaiipour | G06F 17/22 |
| 2019/0122043 A1 | 4/2019 | Bala et al. | |

OTHER PUBLICATIONS

International Application Serial No. PCT/US2019/025320, International Search Report, dated Jun. 21, 2019, 2 pgs.
International Application Serial No. PCT/US2019/025320, Written Opinion, dated Jun. 21, 2019, 4 Pgs.

* cited by examiner

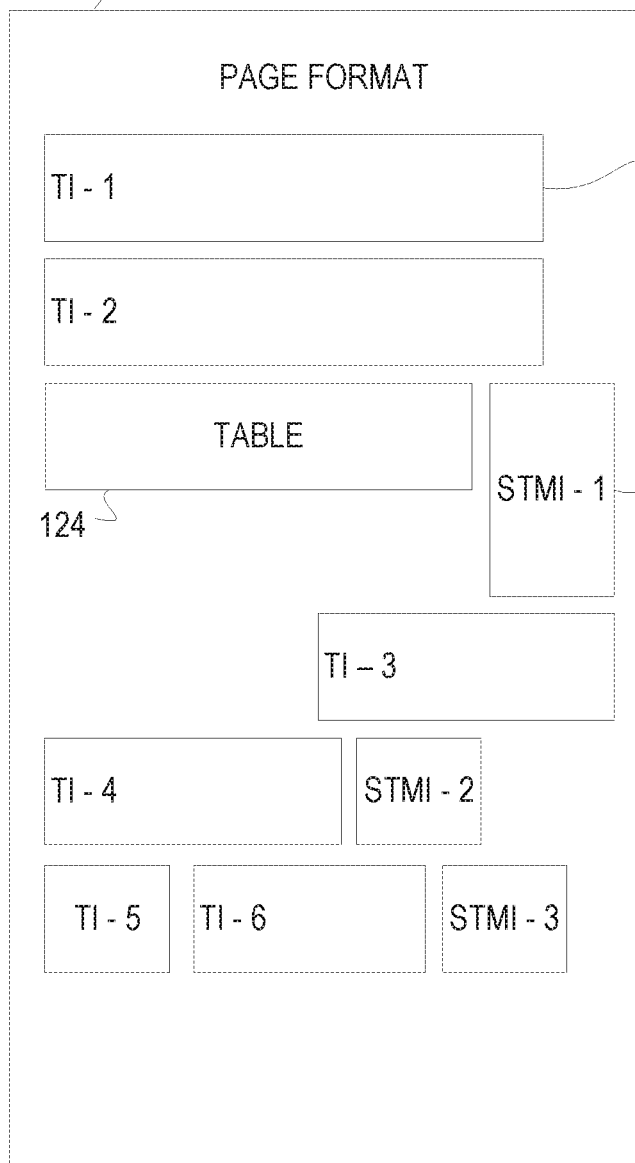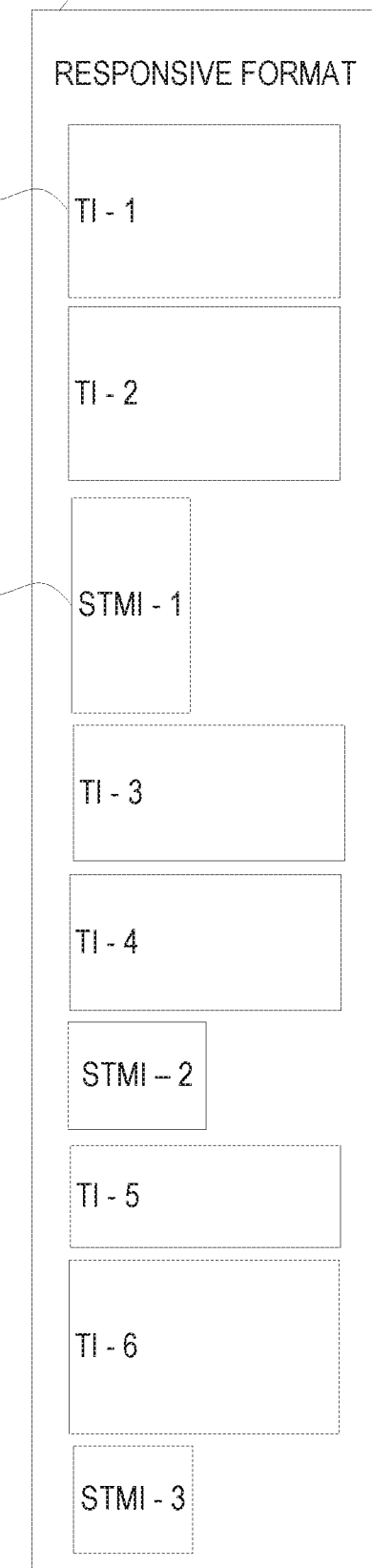

METHOD TO SORT VISUAL ELEMENTS

TEXT IMAGE (TI) OVERLAPS SIGNATURE TAG MARKER IMAGE (STMI)

1) IF TI LEFT OF STM AND OVERLAPS STM THEN SELECT TI
2) IF MULTIPLE TI LEFT OF STM AND BOTH OVERLAP STMI THEN SELECT TI WITH GREATEST OVERLAP
3) IF MULTIPLE TI LEFT OF STMI AND BOTH OVERLAP STMI WITH SAME OVERLAP THEN SELECT TI WITH RIGHT EDGE CLOSEST TO STMI

TEXT IMAGE (TI) DOES NOT OVERLAP SIGNATURE TAG MARKER IMAGE (STMI)

1) IF TI ABOVE STMI THEN SELECT TI
2) IF MULTIPLE TI ABOVE STMI THEN SELECT TI CLOSEST TO STMI
3) IF MULTIPLE TI ABOVE STM AND MULTIPLE TI ARE THE SAME DISTANCE TO THE STMI THEN SELECT TI FURTHEST RIGHT

*FIG. 3E*

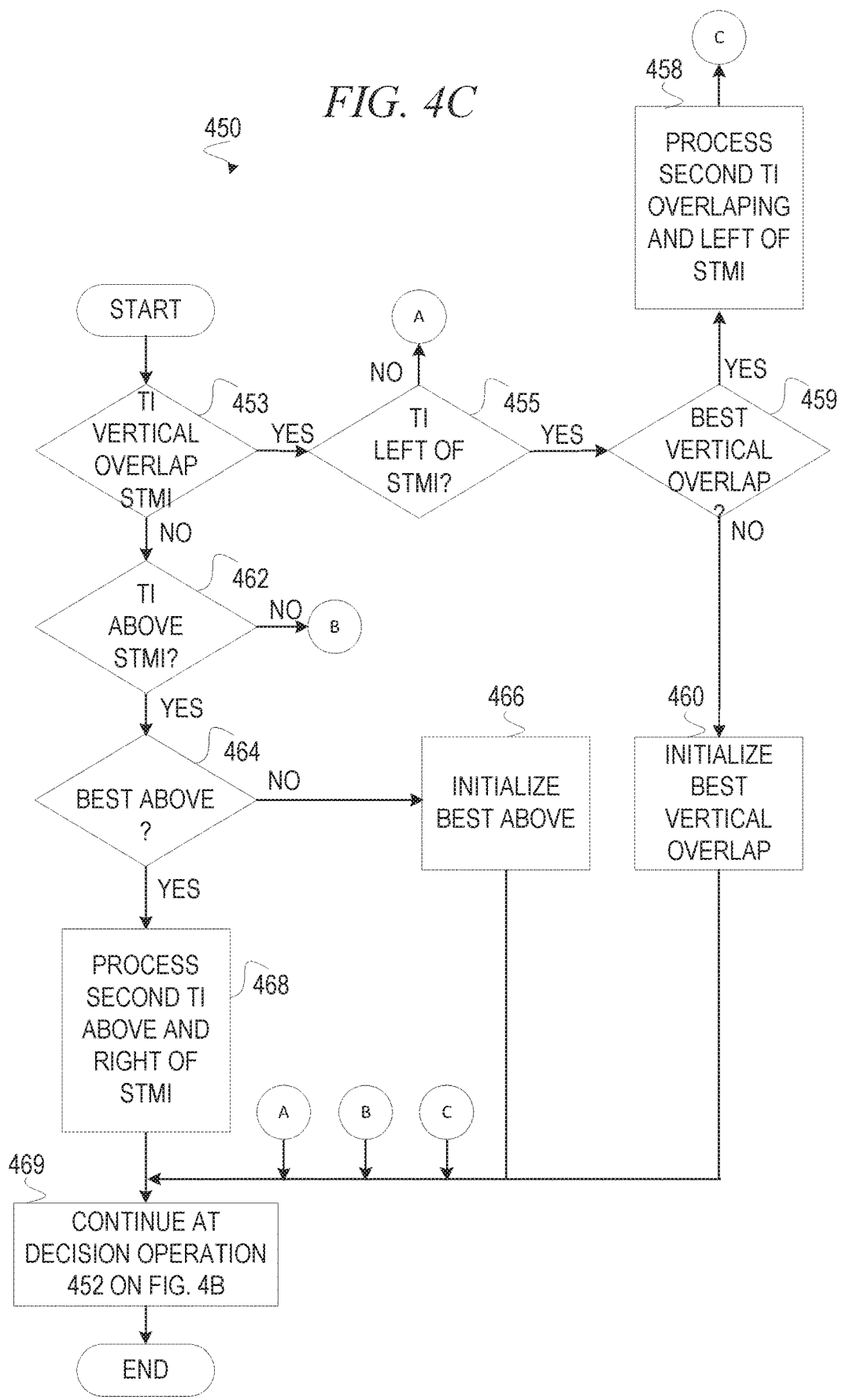

SYSTEMS AND METHODS TO IMPROVE A TECHNOLOGICAL PROCESS FOR SIGNING DOCUMENTS

CLAIM OF PRIORITY

This application is a continuation of U.S. application Ser. No. 16/372,844, filed Apr. 2, 2019, now U.S. Pat. No. 10,776,563, which application claims the benefit of priority to U.S. Provisional Application Ser. No. 62/652,744, filed on Apr. 4, 2018, all the content of which is incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright DocuSign, Inc. 2018, All Rights Reserved.

TECHNICAL FIELD

Example embodiments relate generally to the technical field of preparing data for signature retrieval and, in one specific example, to a technological process for signing documents.

BACKGROUND

An electronic document may be tagged with a visual element for receiving a digital signature. For example, presentation of an agreement may include a visual element for receiving a digital signature that legally binds the signer to the agreement. Presentation of the legal agreement is often in page format where entire pages are presented for viewing. Page format helps to ensure the signer is legally bound to the agreement by enhancing a "what you see is what you sign" (WYSIWYS) property associated with the electronic document. Maximizing the WYSIWYS property makes it more likely that a semantic interpretation of the digitally signed document is not changed, either by accident or by intent. If the WYSIWYS property is ignored, a digital signature may not be enforceable at law because, unlike a paper document, an electronic document is not bound by its medium of presentation (e.g., layout, font, font size, etc.) and the medium of presentation may change the semantic interpretation of its content. Accordingly, one may anticipate showing intent in a legal proceeding by presenting an image of the electronic document throughout a technological process for signing documents in page format. Nevertheless, page format is associated with other technical difficulties. Indeed, viewing an electronic document in page format on a mobile device is visually challenging to a signer because the small screen may cause the signer to zoom-in, zoom-out, and reposition the electronic document before signing.

BRIEF DESCRIPTION OF DRAWINGS

Various ones of the appended drawings merely illustrate example embodiments of the present disclosure and cannot be considered as limiting its scope.

FIG. 3A is a block diagram illustrating a page format, according to an embodiment;

FIG. 3B is a block diagram illustrating a responsive format, according to an embodiment;

FIG. 3E is a block diagram illustrating a method to sort visual elements, according to an embodiment;

FIG. 4C is a block diagram illustrating a method to identify a position of a text image, according to an embodiment;

DETAILED DESCRIPTION

Figure 1A:
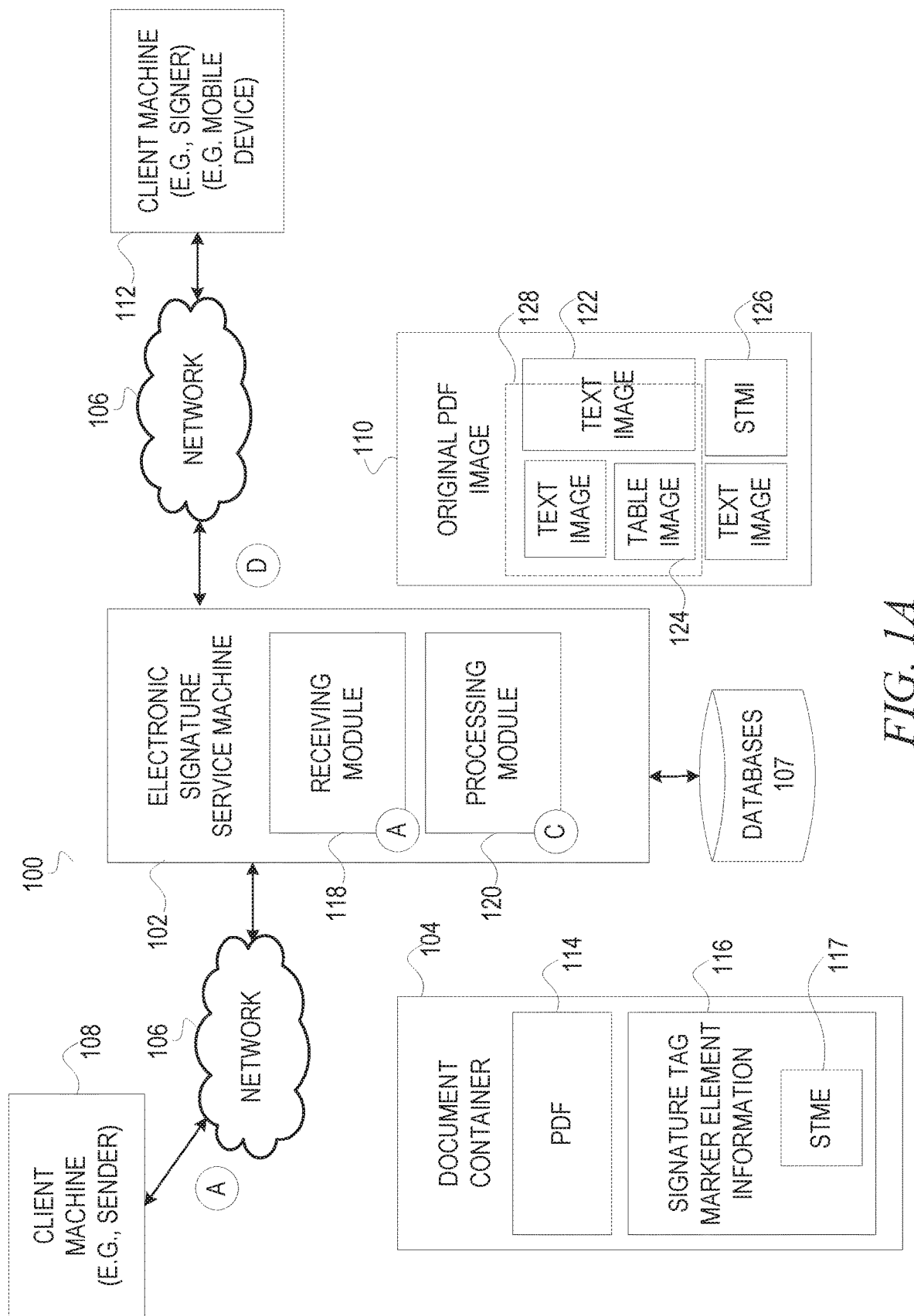
FIG. 1A is a block diagram illustrating a system in the prior art, according to an embodiment.

The description that follows includes systems, methods, techniques, instruction sequences, and computing machine program products that embody illustrative embodiments of the present disclosure. In the following description, for purposes of explanation, numerous specific details are set forth in order to provide an understanding of an embodiment of the inventive subject matter. It will be evident, however, to those skilled in the art, that embodiments of the inventive subject matter may be practiced without these specific details. In general, well-known instruction instances, protocols, structures, and techniques have not been shown in detail.

The inventors have recognized a need to provide a more user-friendly and readable presentation of electronic documents on a mobile device during an electronic signature process. As mentioned above, preserving the integrity of a document may be critical to validation of proper electronic or digital signatures. However, as it become increasing common for electronic signature processes to occur on mobile devices with limited screen space, presenting standard PDF or similar documents that do not easily conform to the limited screen space presents a technical challenge. End users need the ability to easily review the terms of an agreement or document presented for electronic signature, but also need to ensure the integrity of the original document is maintained throughout the process.

Presently the integrity of a document may be preserved by presenting the document a page format (e.g., increases the value of a WYSIWS property). The page format may be used to display entire pages of a standard PDF on a client device in a manner that maintains the semantic integrity of the document. For example, consider an original PDF image including five pages and presented in page format. The user may advance forward or backward through an original PDF image by incrementing or decrementing the page number. Further, the user may scroll up or down the original PDF image viewing the clearly marked page boundaries and the image elements. Each of the image elements are displayed on predetermined pages, in predetermined locations on a page, and in a predetermined proportion to the dimensions of the page. For example, each of the image elements may be fixed with respect to the document (e.g., page number), page (e.g., position on the page), and page dimensions (e.g., dimensions of the image element relative to dimensions of the page). More specifically, image elements for displaying text are displayed in proximity to corresponding image elements for receiving signing information (e.g., signature, social security number, etc.).

One solution to the above mentioned technical challenge is to represent the image elements in a hypertext markup language (HTML) for rendering in a responsive format that is responsive to the screen size at a client machine. Nevertheless, representing the image elements in a responsive format by using HTML presents a technical challenge because HTML does not use fixed positions for presentation. Further, as mentioned above, it is critical that an image element for text be positioned in proximity to its corresponding image element that is utilized for receiving signing information. Otherwise, the semantic relationship between the corresponding image elements may violate the WYSIWS property.

The present inventors have developed a solution that allows for maintenance of the document integrity in receiving signing information, while providing the ability to reflow document contents into a format more easily displayed and manipulated on a mobile device. Accordingly, the solution improving a technological process for signing documents. More specifically, the solution utilizes a responsive format that maintains the semantic relationship between an image element for display of text and its corresponding image element for receipt of signing information. To this end, the solution utilizes a method to sort visual elements that parses the original PDF image to pair the image element for display of text to its corresponding image element for receipt of signing information. Accordingly, the semantic relationships between the corresponding image elements included in an electronic document are maintained and the WYSIWS property is not violated. In addition, the solution maintains an identifier for each of the image elements for receiving signing information while being displayed in the responsive format. The identifier is subsequently utilized for receiving the signing information and for finally repositioning the signing information in the original PDF image in page format. Accordingly, the solution improves a technological process for signing documents by forming a complete loop—beginning with an electronic PDF document in a fixed format, reformatting the electronic document into HTML in a responsive format (for receipt of signature information without violation of semantic relationships) and finally representing the electronic PDF document in fixed format for a final presentation of the original PDF image with signatures.

FIG. 1A is a block diagram illustrating a system 100, as found in the prior art. The system 100 may include an electronic signature service machine 102 that receives a document container 104, over a network 106, from a client machine 108 and processes the document container 104 to generate original portable document format (PDF) image information and communicate the original PDF image information, over the network 106, to a client machine 112 for rendering on the client machine 112 to display the original PDF image 110. The electronic signature service machine 102 may be electronically coupled to a database 107 for storing the document container 104 and other data structures. The document container 104 may include a PDF 114 and signature tag marker element information 116 including one or more signature tag marker elements 117. The PDF 114 may be created by a sender operating the client machine 108. For example, the PDF 114 may have been created from a Microsoft Word file with one or more work flows developed by Adobe Systems Incorporated, an American multinational computer software company headquartered in San Jose, Calif. The PDF 114 may further be associated with signature tag marker element information 116 including one or more signature tag marker elements 117 that were positioned over the PDF 114 by the sender. The signature tag marker elements 117 may be utilized for receiving signing information (e.g., approval, checkbox, date signed, signature, social security number, organizational title, etc.) in association with the visual elements contained in the PDF 114. The sender may have positioned the one or more signature tag markers over the PDF 114 with tools, apps, and work flows developed by DocuSign @, a San Francisco-based company that provides electronic signature technology and digital transaction management services for facilitating electronic exchanges of contracts and signed documents. For example, the PDF 114 may be a commercial lease that is associated with one or more or more signature tag marker elements 117 for receiving signing information to memorialize an agreement between a landlord and tenant to lease a parcel of commercial property. For example, the signing information may include a signature, title, date signed, and other visual elements.

Broadly, a technological process for signing electronic documents may operate as follows. At operation "A," the sender, at the client machine 108 (e.g., client device) uploads the document container 104, over the network 106, to the electronic signature service machine 102. At operation "B," a receiving module 118, at the electronic signature service machine 102, receives the document container 104 and, at operation "C," a processing module 120, at the electronic signature service machine 102, processes the document container 104. The processing module 120 may process the document container 104 to generate original PDF image information that is rendered at a client machine 112 to display an original PDF image 110 including multiple and varied visual elements. The processing module 120 may generate the visual elements based on separate and distinct input including the PDF 114 and the signature tag marker elements 117. As mentioned above, the PDF input in the form of the PDF 114 may be received from and generated by one or more work flows developed by Adobe Systems Incorporated. As further mentioned above, the signature tag marker element 117 input may be received from and generated by work flows developed by DocuSign @. Accordingly, the PDF and the signature tag marker elements 111 are separate and distinct input as they are generated by different workflows provided by different providers. The processing module 120 may generate the original PDF image information for rendering visual elements in the form of text images 122, table images 124, signature tag marker images 126 and other types of visual elements. The original PDF image information may be generated from the document container 104 including original documents elements included in the PDF 114 and the signature tag marker information including the signature tag marker elements 111. Other visual elements for rendering images may include an illustration image, a graphic image, a header image, a footer image, a photograph image, etc.

At operation "D," the processing module 120 may communicate the original PDF image information over the network 106 to one or more client machines 112 (e.g., client device) for rendering the original PDF image 110. The client machines 112 may be associated with signers who are targeted for signing the original PDF image 110 by the sender. The sender may have utilized various work flows to identify the signers and their network addresses (e.g., email address). For example, the sender may utilize workflows to identify multiple parties to the lease including bankers, landlord, and tenant. Further, the sender may utilize workflows to identify network addresses (e.g., email address) for each of the signers. The processing module 120 may further be configured by the sender (e.g., operation "A") whether to communicate the original PDF image 110 in series or parallel. For example, the processing module 120 may utilize a workflow to configure communication of the original PDF image information in series to obtain the signature of the first party before communicating the original PDF image information, including the signature of the first party, to a second party to obtain the signature of the second party before communicating the original PDF image information, including the signature of the first and second party to a third party, and so forth. Further for example, the sender may utilize workflows to configure communication of the original PDF image information in parallel to multiple parties including the first party, second party, third party, and so forth, to obtain the signatures of each of the parties irrespective of any temporal order of their signatures.

Continuing with operation "D," the processing module 120 may communicate the original PDF image information to the one or more parties associated with the client machine(s) 112 in a page format. Communicating in page format, by the processing module 120, ensures that entire pages of the original PDF image 110 are rendered on the client machine 112 throughout the signing process. The page format is utilized by the processing module 120 to address potential legal requirements for binding a signer. The processing module 120 utilizes the page format because a signer is only bound to a legal document that the signer is intended to be bound. To satisfy the legal requirement of intent, the processing module 120 generates PDF image information for rendering the original PDF image 110 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law.

The WYSIWYS property recognizes that, unlike a paper document, a digital document is not bound by its medium of presentation (e.g., layout, font, font size, etc.) and a medium of presentation may change the semantic interpretation of its content. Accordingly, the processing module 120 anticipates a possible requirement to show intent in a legal proceeding by generating original PDF image information for rendering the original PDF image 110 in page format. The processing module 120 presents the original PDF image 110 on a screen of a display device in the same way the processing module 120 prints the original PDF image 110 on the paper of a printing device.

Notwithstanding the legal issues admonishing generating original PDF image information with a WSIWYS property, the page format presents difficulties for signers who are attempting to sign the original PDF image 110 on a mobile device (e.g., smart phone). The page format presents a technical problem to a signer operating a mobile device because the screen size of the mobile device is smaller than other devices, causing the text size to be visually difficult to read. The original PDF image 110 is illustrated with a screen boundary 128 representing what may be seen on the monitor of a mobile device. The screen boundary 128 is illustrated as overlaying a page of the original PDF image 110 to illustrate a text image as not fully fitting inside the screen boundary 128. Signers operating the mobile device may navigate a page of original PDF image 110 to zoom in/out of different parts of the original PDF image 110 before signing. This represents a hardship for the signer who, in some instances, may close the "app" only to later reopen the original PDF image 110 on a desktop computer to apply their signature. Accordingly, the utilization of the page format for presentation of the original PDF image 110 on a mobile device may increase a value quantifying a WSIWYS property, but nevertheless fails to address a technical problem in a technological process for signing documents that is created by presenting text images 122 on a screen with a limited screen size on a mobile device.

Figure 1B:
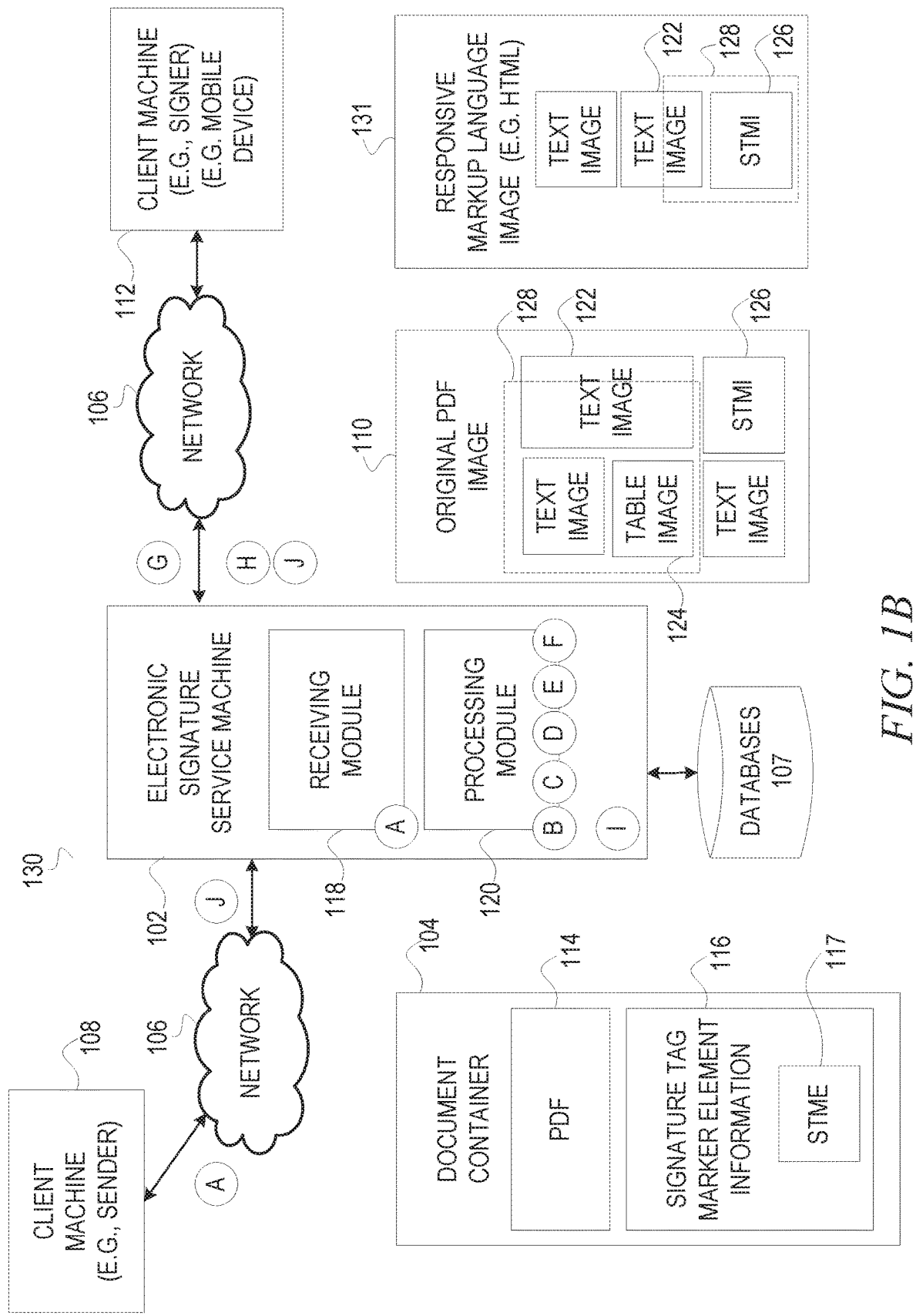
FIG. 1B is a block diagram illustrating a system to improve a technological process for signing documents, according to an embodiment.

FIG. 1B is a block diagram illustrating a system 130 to improve a technological process for signing documents, according to an embodiment. The system 130 corresponds to the system 100 in FIG. 1, accordingly, the same or similar references have been used to indicate the same or similar features unless otherwise indicated. The system 130 operates as follows. At operation "A," the receiving module 118, at the electronic signature service machine 102, receives the document container 104 from the client machine 108 and accesses the document container 104. The document container 104 may include the PDF 114 and signature tag marker element information 116 including at least one signature tag marker elements 111. At operation "B," the processing module 120 may parse the PDF 114 to extract original document elements. At operation "C," the processing module 120 identifies text blocks in the original document elements and extracts the text blocks from the original document elements. At operation "D," the processing module 120 generates logical text block elements corresponding to the original document elements identified as text blocks. A logical text block element may be utilized to characterize a text block and identify the logical text block with a logical text block identifier. For example, the logical text block element may include signature geometric information describing the geometric qualities of a text image 122 corresponding to a text block. For example, the signature geometric information may include a page number, an x-coordinate using the top left corner of the page as an origin, a y-coordinate using the top left corner of the page as an origin, height information including a measurement of the height of a text image 122 corresponding to the logical text block on the page, width information including a measurement of the width of the text image 122 on the page, and the value of the text image 122 (e.g., words, punctuation, formatting, etc.). Further, each signature tag marker element 117 includes signature geometric information that is like the logical text block geometric information and comparable with the logical text block geometric information. At operation "E," the processing module 120 invokes a method to sort visual elements to pair each signature text marker image 126 with a text image 122 identified as closest or proximate to the signature tag marker image 126. For example, the method to sort visual elements may be utilized to sort the text images 122 (corresponding to each logical text block including a logical text block identifier) against each signature tag marker image 126 to pair each signature text marker image 126 with a text image 122 identified as closest or proximate to the signature text marker image 126. The method to sort visual elements selects a text image 122 that overlaps a signature text marker image 126 over a text image 122 that is above the signature text marker image 126. Further, the method to sort visual elements utilizes "Best Vertical Overlap" and the "Best Above" categories. At operation "F," the processing module 120 generates markup language information based on the identified proximities and a size of the screen detected at a client machine 108 (e.g., mobile device). The markup language information may be utilized at the client machine 108 to render a responsive markup language image 131 in a responsive format. The responsive format is responsive to the screen size that is detected at the client device. For example, the responsive markup language information 131 may include cascading style sheets (CSS) ensuring a text image 122 corresponding to a logical text block element automatically reformats based on the width of the screen. In addition, the processing module 120 generates the markup language information to ensure that each signature tag marker image 126 is presented immediately below the text image 122 identified as closest or proximate in the original PDF image 110. At operation, "G," the processing module 120 communicates the markup language information, over the network 106, to the client machine 112 (e.g., mobile device) for rendering the responsive markup language image 131 or the client machine 112. At operation, "H," the processing module 120 may receive the signing information, over the network 106, from the client machine 112. At operation "I," the processing module 120 may associate the signing information to the appropriate signature tag marker image 126 based on a signature tag marker identifier and, at operation J, the processing module 120 may communicate the original PDF image 110 and the signing information, over the network 106, in page format to one or more client machines 108, 112. Accordingly, the original PDF image 110 and the signing information may be rendered on a client machine 108, 112 in a page format or a responsive format to improve a technological process for signing documents.

In another embodiment, the original PDF image 110 and the signing information may be rendered on a client machine 108, 112 in a responsive format based on anchor string information. The anchor string information may be received in signature tag marker element information 116. For example, each signature tag marker element 117 may include anchor string information including a string of text that is compared to text included in a text image 122 in the original PDF image 110. Responsive to identifying a match, the processing module 120 may position the signature tag marker element 117 immediately below the text image 122 based on the signature geometric information included in the signature tag marker element 117. Accordingly, the original pdf image 110 and the signing information may be rendered on a client machine 108, 112 in a page format based on the anchor string information or a responsive format based on the anchor string information to improve a technological process for signing documents.

Figure 2A:
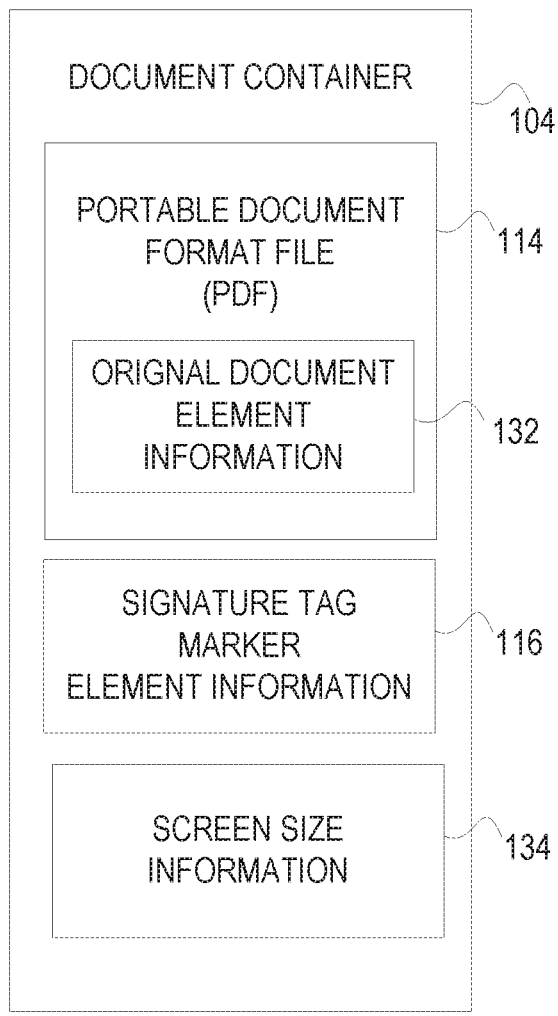
FIG. 2A is a block diagram illustrating a document container, according to an embodiment.

FIG. 2A is a block diagram illustrating a document container 104, according to an embodiment. The document container 104 may be created on a client machine (e.g., client machine 108) and uploaded to the electronic signature service machine 102. The document container 104 may include the PDF 114, as previously described, signature tag marker element information 116, as previously described, and screen size information 134. The PDF 114 may include original document element information 132 including text blocks, photographs, tables, and other elements that are utilized to create original document element images, as described later in this document. The signature tag marker element information 116 may be utilized to receive signature information from a client machine (e.g., client machine 112). The signature tag marker elements 111 may be dropped and dragged onto the PDF 114 at the client machine 108, shown in FIG. 1. The signature tag marker elements 111 may include elements for an approval, a checkbox, a company, a signature, etc. The signature tag marker element information 116 may be utilized to create signature tag marker images 126, as described later in this document. The screen size information 134 may include one or more measurements of a screen being utilized for displaying the original PDF image 110, the responsive markup language image 131, or other images. In one embodiment, the screen size information 134 may be iterated, each iteration describing a screen electronically coupled to a client machine 108, 112.

Figure 2B:
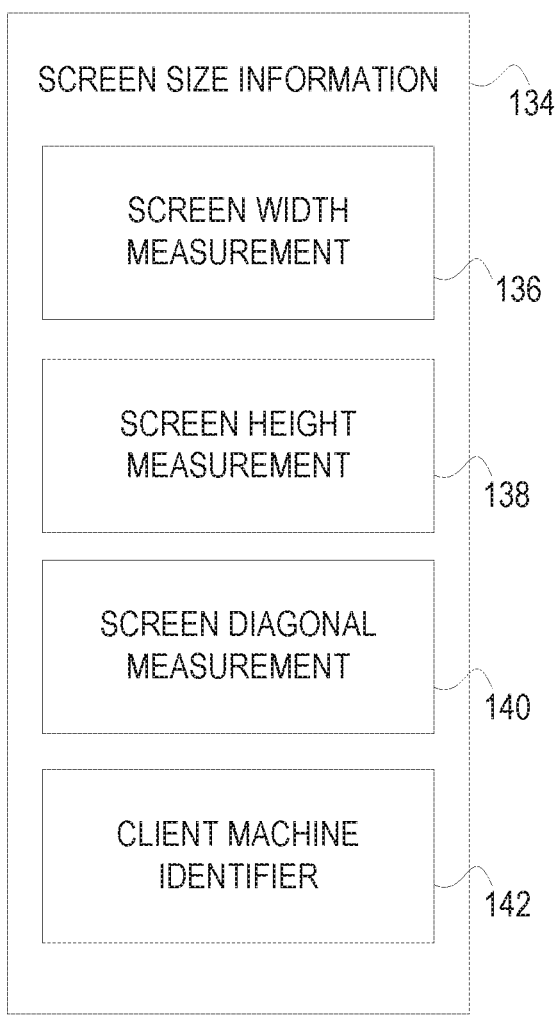
FIG. 2B is a block diagram illustrating screen size information, according to an embodiment.

FIG. 2B is a block diagram illustrating screen size information 134, according to an embodiment. The screen size information 134 may include a screen width measurement 136, a screen height measurement 138, a screen diagonal measurement 140, and a client machine identifier 142 (e.g., client machine 108, client machine 112, etc.). The measurements may be quantified in different units. For example, the screen width measurement 136, the screen height measurement 138, and the screen diagonal measurement 140 may be quantified as centimeters, pixels, inches, and the like. The client machine identifier 142 identifies a client device in association with the screen being described. For example, client machine identifier 142 may identify a client device (e.g., mobile device) in the form of an Apple iPhone® X that is electronically coupled to the screen being described.

Figure 2C:
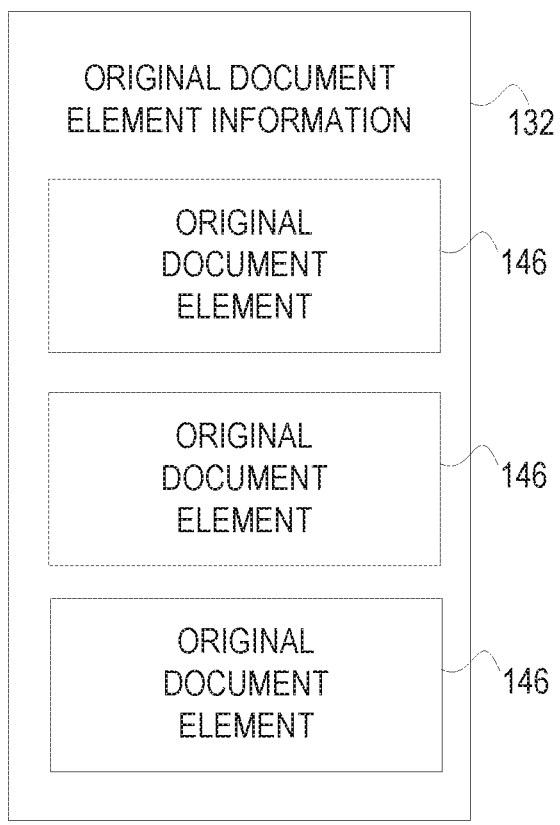
FIG. 2C is a block diagram illustrating original document elements, according to an embodiment.

FIG. 2C is a block diagram illustrating original document elements information 132, according to an embodiment. The original document element information 132 may be included in the PDF 114. The original document element information 132 may include one or more original document elements 146.

Figure 2D:
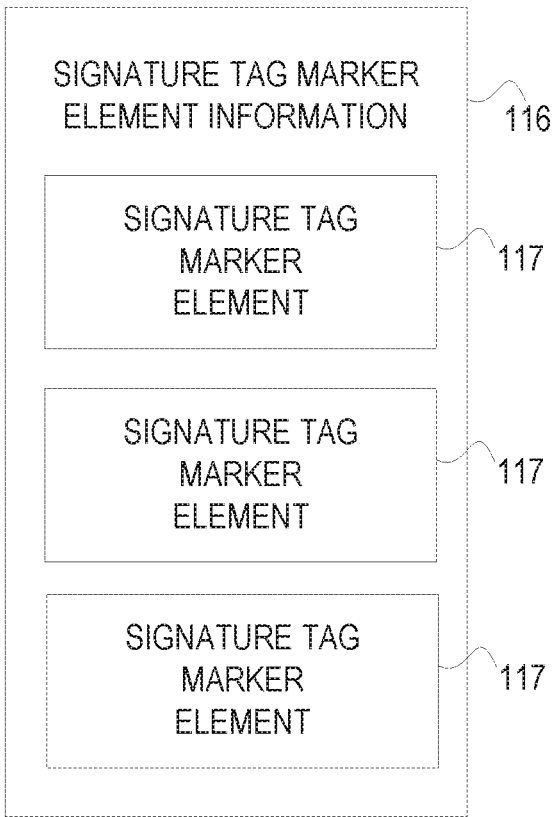
FIG. 2D is a block diagram illustrating signature tag marker elements, according to an embodiment.

FIG. 2D is a block diagram illustrating signature tag marker element information 116, according to an embodiment. The signature tag marker element information 116 may be included in the document container 104. The signature tag marker element information 116 may include one or more signature tag marker elements 148 for receiving signing information.

Figure 2E:
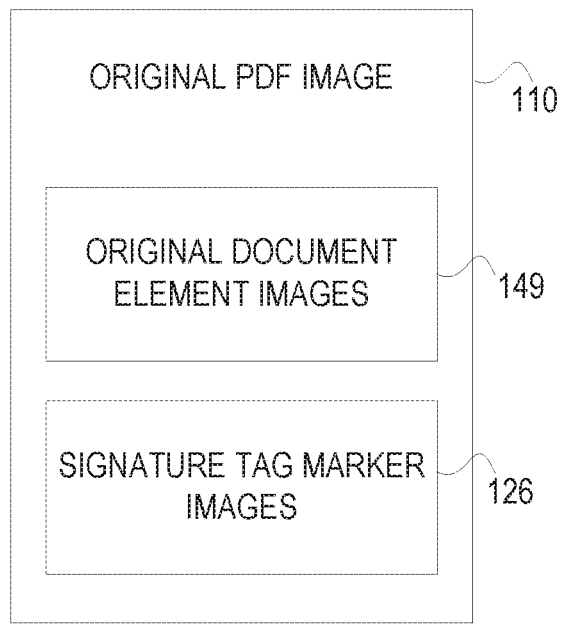
FIG. 2E is a block diagram illustrating an original PDF image, according to an embodiment.

FIG. 2E is a block diagram illustrating an original PDF image 110, according to an embodiment. The original PDF image 110 may be rendered at a client machine (e.g., client machine 112) to display an image on a screen electronically coupled to the client machine 112. The original PDF image 110 may include original document element images 149 that are created from original document elements 146. In addition, the original PDF image 110 may include signature tag marker images 126 that are created from signature tag marker elements 111.

Figure 2F:
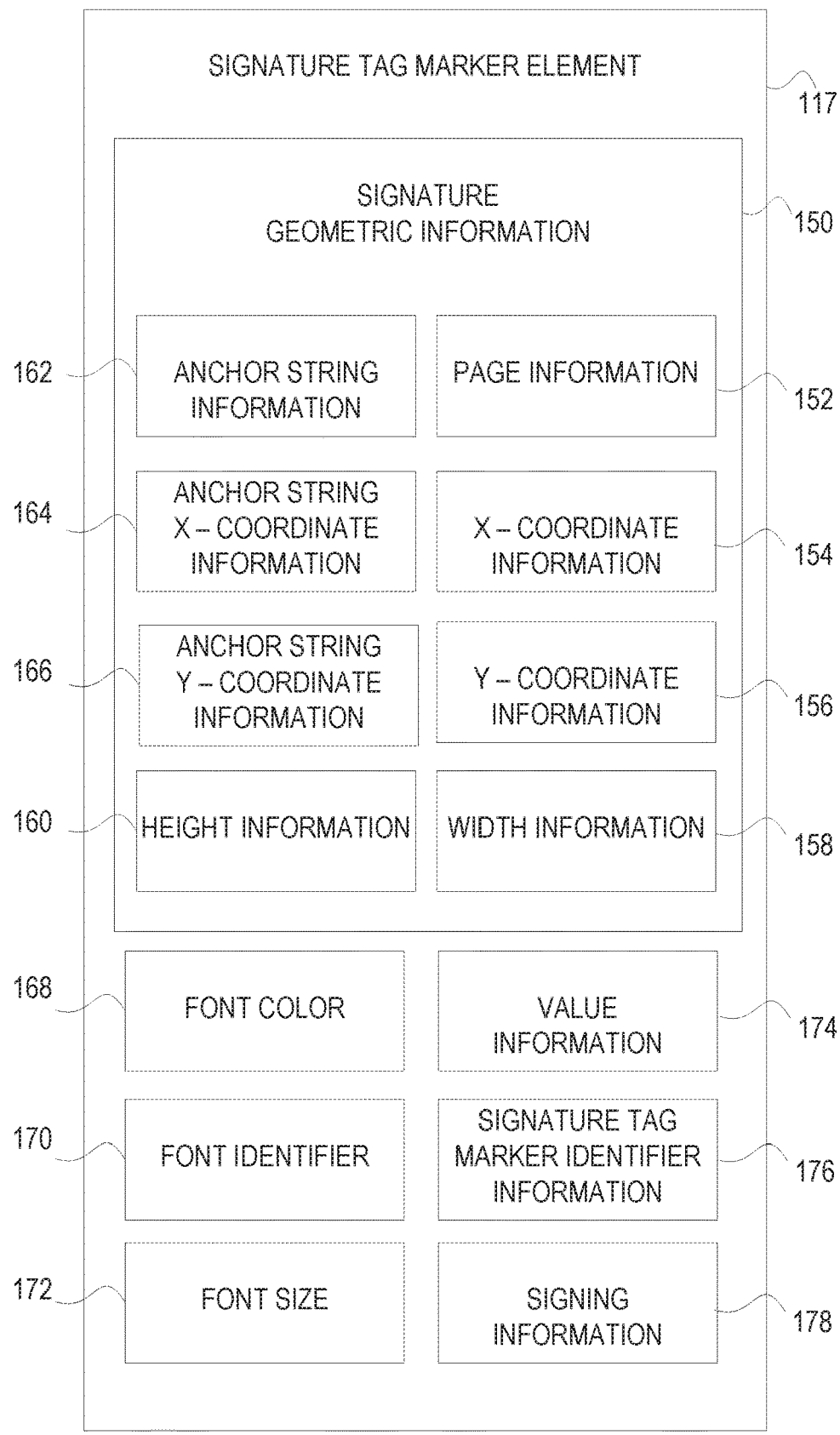
FIG. 2F is a block diagram illustrating a signature tag marker element, according to an embodiment.

FIG. 2F is a block diagram illustrating a signature tag marker element 117, according to an embodiment. The signature tag marker element 117 describes a simple/standard electronic signature that may be utilized in Common Law countries, according to an embodiment. For example, the signature tag marker element 117 may be embodied as an "eSignature" (eSig) offered by Docusign®, according to an embodiment. The signature tag marker element 117 may include signature geometric information 150 describing the signature tag marker image 126 that is rendered from the signature tag marker element 117. The signature geometric information 150 may include page information 152, X-coordinate information 154, Y-coordinate information 156, width information 158, height information 160, anchor string information 162, anchor string X-coordinate information 164, and anchor string Y-coordinate information 166. The page information 152 may include a page number for positioning the signature tag marker image 126 in the original PDF image 110. The X-coordinate information 154 is utilized for positioning the signature tag marker image 126 in the original PDF image 110. The X-coordinate information 154 may include a horizontal offset of the signature tag marker image 126 in a coordinate space that has left top corner of the identified page in the original PDF image 110 as origin. According to one embodiment, seventy-two dots per inch may be utilized for positioning. The Y-coordinate information 156 may include a vertical offset of the signature tag marker image 126 in a coordinate space that has left top corner of the identified page in the original PDF image 110 as origin. The width information 158 may include the width of the signature tag marker image 126 in pixels. The height information 160 may include the height of the signature tag marker image 126 in pixels. The anchor string information 162 may be utilized to specify a string that is searched for in the value information of logical text block elements. Matching an anchor string to text rendered in a corresponding text image 122 results in positioning a signature tag marker image 126 below the text image 122 in an original PDF image 110 or a responsive markup language image 131. The anchor string X-coordinate information 164 may specify a location to place one or more signature tag marker images 126 (corresponding to the current signature tag marker element 117) in an original PDF image 110 or responsive markup language image 131. The anchor string X-coordinate information 164 may be utilized as an X offset from the anchorString and specified in predetermined and configurable units (e.g., pixels, millimeters, centimeters, or inches). The anchor string Y-coordinate information 166 may specify a location to place one or more signature tag marker images 126 (corresponding to the current signature tag marker element 117) in an original PDF image 110 or responsive markup language image 131. The anchor string Y-coordinate information 166 may be utilized as a Y offset from the anchorString and specified in predetermined and configurable units (e.g., pixels, millimeters, centimeters, or inches). The signature tag marker element 117 further includes a font color 168 indicating a rendering of the color of the font, a font identifier 170 identifying the font (e.g., Times New Roman, Calibri, etc.), a font size 172 indicating a point size or some other measurement of size, value information 174 indicating the content of the signature tag marker (e.g., words or other elements prompting receipt of signing information, etc.), signature tag marker identifier information 176 (e.g., signature tag marker identifier) uniquely identifying this signature tag marker from others, and signing information 178 for storing signing information received from a client machine 108, 112.

Figure 2G:
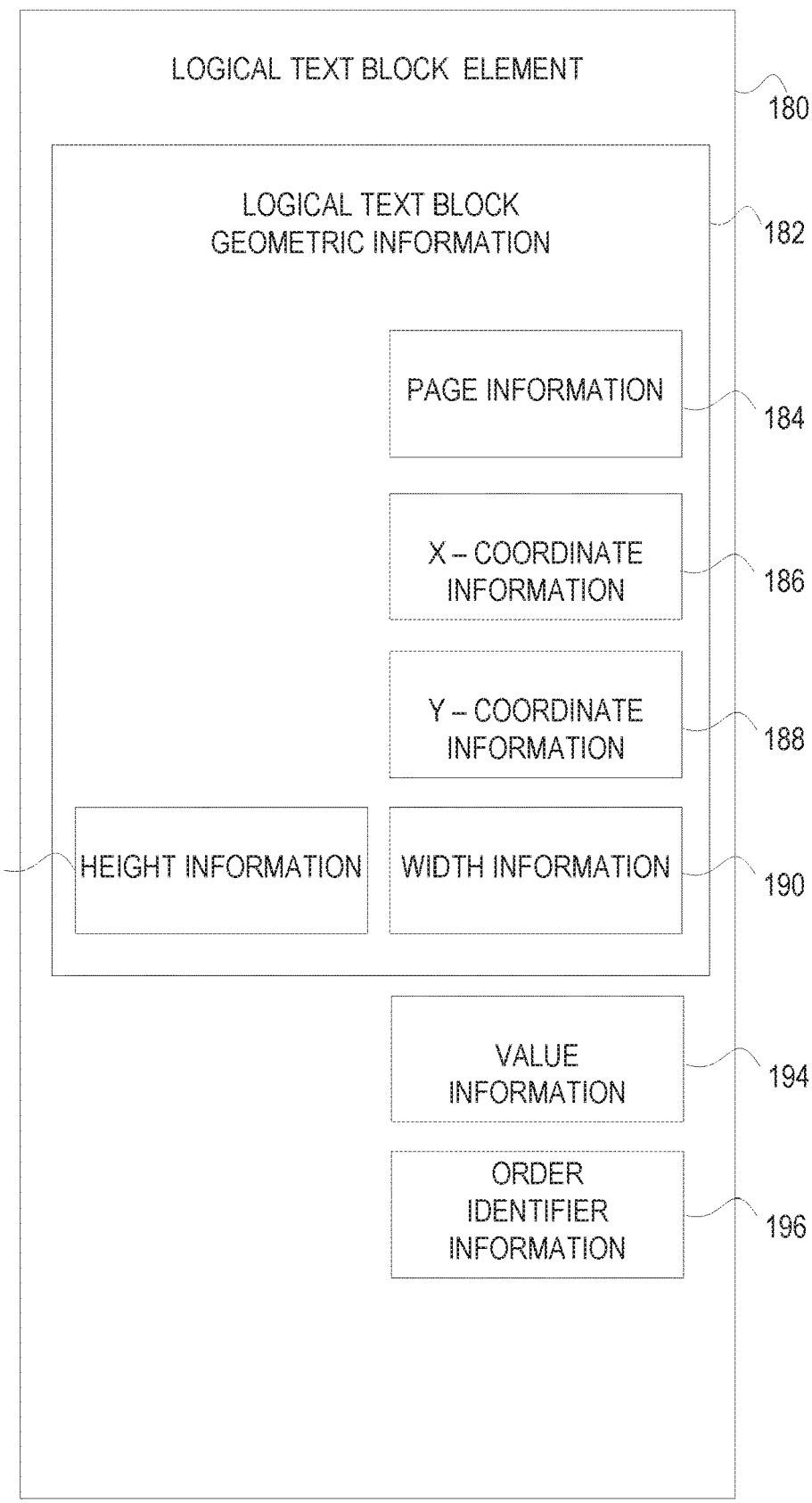
FIG. 2G is a block diagram illustrating a logical text block element, according to an embodiment.

FIG. 2G is a block diagram illustrating a logical text block element 180, according to an embodiment. The logical text block element 180 may include logical text block geometric information 182 describing a text image 122 that is rendered from the logical text block element 180. The logical text block geometric information 182 may include page information 184, X-coordinate information 186, Y-coordinate information 188, width information 190, height information 192. The page information 152 identifies a page number where the text image 122 is rendered in the original PDF image 110. The X-coordinate information 154 may include a horizontal offset of the logical text block element 180 on the page (e.g., page information 152) in a coordinate space that has left top corner of the original PDF image 110 as origin. According to one embodiment, seventy-two dots per inch may be utilized for positioning. The Y-coordinate information 188 may include a vertical offset of the text image 122 on the page (e.g., page information 152) in a coordinate space that has left top corner of the original PDF image 110 as the origin. The width information 158 may include the width of the text image 122 in pixels. The height information 160 may include the height of the text image 122 in pixels. The text image 122 further includes value information 174 and order identifier information 196. The value information 194 indicates the content of the text image 122 (e.g., text, words etc.). The value information 194 may be searched by the processing module 120 based on anchor string information 162, as registered a signature tag marker element 117, as shown in FIG. 2E, to identify a match. Returning to FIG. 2F, matching anchor string information 162 causes the processing module 120 to pair the signature tag marker element 117, including the anchor string information 162 to the logical text block element 180 resulting in a corresponding signature tag marker image 126 being rendered below the text image 122 corresponding to the logical text block element 180. Accordingly, the anchor string information 162 included in a signature tag marker element 117 may be matched to multiple logical text block elements 180 including the current one. The order identifier information 196 may include a logical text block identifier that uniquely identifies this logical text block from others on the page.

FIG. 3A is a block diagram illustrating a page format 300, according to an embodiment. The page format 300 is utilized to display entire pages of a PDF 114 on a client machine 108, 112. For example, consider an original PDF image 110 corresponding to the PDF 114, the original PDF image 110 including five pages in page format. The user may select a page to view. Further, the user may advance forward or backward through the original PDF image 110 by incrementing or decrementing the page number. As the user scrolls up or down the original PDF image 110 the page boundaries are clearly marked. Further, the image elements (e.g., original document elements images 126 and the signature tag marker images 126) are a fixed with respect to the document (e.g., page number), fixed in a location on the page, and, fixed in proportion to the dimensions of the page. For example, consider an example original PDF image 110 with the top left corner being utilized as an origin (e.g., 0, 0). Continuing with the example original PDF image 110, a first set of the image elements appear on a page identified with a fixed page number, appear in a location on the page, and appear in a fixed proportion to the presentation of the page. For example, in zooming-in to the page each of the image elements on the page scale proportionally larger in a fixed relationship to each other. Also for example, in zooming-out of the page each of the image elements on the page scale proportionally larger in a fixed relationship to each other. The page format 300 includes visual elements in the form of text images 122 designated ("1," "2," "3," "4," "5," and "6") a table image 124, and signature tag marker images 126 designated ("1," "2," and "3"). The visual images are all included in a single page of the original PDF image 110. Entire pages are displayed on a client machine 108, 112.

FIG. 3B is a block diagram illustrating a responsive format 302, according to an embodiment. The responsive format 302 includes multiple visual elements. The responsive format 302 may be rendered on the screen of a client machine 108, 112 responsive to the screen size being detected at a client machine 108, 112 and facilitates reading because the text images 122 are not rendered in a fixed location on a fixed page, as in the original PDF image 110 (e.g., page format). Rather, the text images 122 automatically reformat in accordance with the width of the page to extend the page indefinitely until the text images 122 are exhausted. The responsive format 302 makes zooming less likely. The text images 122 in FIG. 3B are lengthened (compare with corresponding text image 122 in FIG. 3A) responsive to the width of the screen on a client machine 108, 112 to conveniently enable reading the text image 122 by scrolling the Y-axis. The responsive format 302 is illustrated based on a reformatting of the visual elements rendered in a page format 300, as shown in FIG. 3A. The responsive format 302 may be generated to include special generalized markup language (e.g., HTML) statements for rendering the visual elements illustrated in FIG. 3B.

Figure 3C:
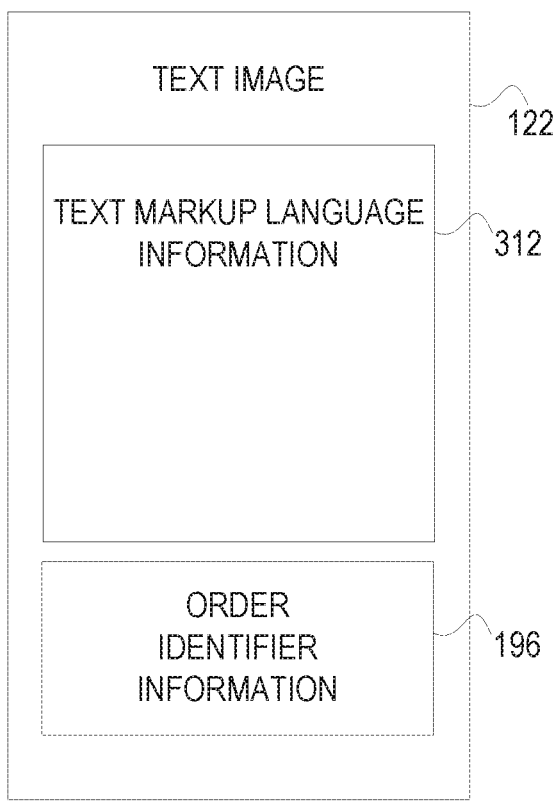
FIG. 3C is a block diagram illustrating a text image, according to an embodiment.

FIG. 3C is a block diagram illustrating a text image 122, according to an embodiment. Recall that the text image 122 corresponds to an original document element 146 in the PDF 114 that is utilized to display text. The text image 122 may include text markup langue information 312 and order identifier information 196. The text markup language information 312 may be utilized for rendering the text image 122 on a screen. The order identifier information 196 uniquely identifies the text image 122.

Figure 3D:
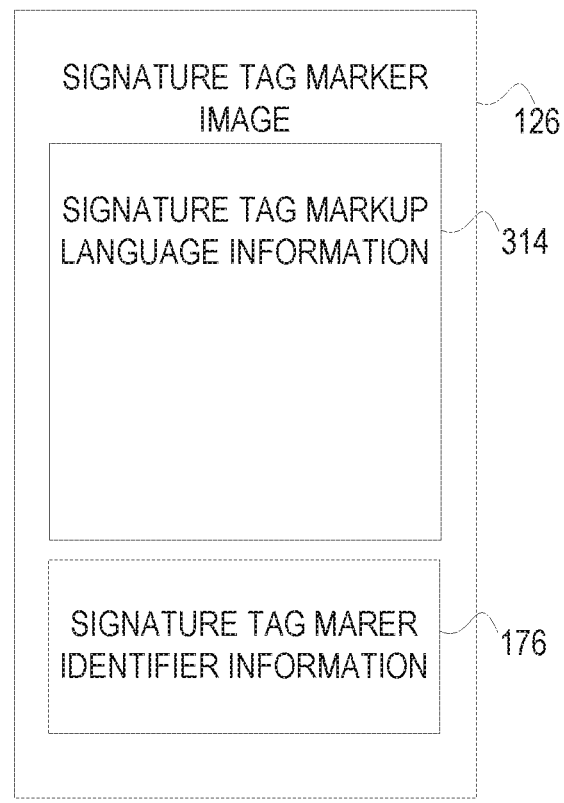
FIG. 3D is a block diagram illustrating a signature tag marker image, according to an embodiment.

FIG. 3D is a block diagram illustrating the signature tag marker image 126, according to an embodiment. The signature tag marker image 126 may include signature tag marker language information 314 and signature tag marker identifier information 176. The markup language information 312 may be utilized for rendering the signature tag marker image 126 on a screen electronically coupled to a client machine 108, 112. The signature tag marker identifier information 176 uniquely identifies the signature tag marker image 126.

FIG. 3E is a block diagram illustrating an overview 320, according to an embodiment, of a method to sort visual elements. The overview 320 illustrates a scheme for selecting a proximate (e.g., "closest) text image 122 to an identified signature tag marker image 126. Other schemes may be utilized. The overview 320 of the method includes an overlap identification 322 and an above identification 324. The overlap identification 322 signifies an identification of one or more text images 122 overlapping the signature tag marker image 126 on a page of the original PDF image 110. The above identification 324 signifies an identification of one or more text images 122 being above the signature tag marker image 126 on a page of the original PDF image 110. The overview 320 illustrates a preference to select a proximate text image 122 that overlaps a signature text marker image 126 to a text image 122 that is above a signature text marker image 126.

Overlap—Text Image(s) Overlap Signature Tag Marker Image

In complex documents multiple blocks of texts (text image(s)) may be adjacent or overlapping with a signature location (signature tag marker image). In these cases, certain processing rules may be used to determine a sensible order for displaying the text images 124 in association with the signature tag marker images 126 when utilizing the responsive format 302. If a single text image 122 is identified as left of a signature tag marker image 126 and overlapping the signature tag marker image 126 on a selected page of the original PDF image 110 then the text image 122 is identified as proximate. If multiple text images 122 are identified as left of the signature tag marker image 126 and overlapping a signature tag marker image 126 on a selected page of the original PDF image 110 then the text image 122 with the greatest overlap with the signature tag marker image 126 is identified as proximate. If multiple text images 122 are identified as left of the signature tag marker image 126 and overlapping the signature tag marker image 126 on a selected page of the original PDF image 110 and the text images 122 are equivalently overlapping then identify the text image 122 with the right edge closest to the signature tag marker image 126 as proximate.

Above-Text Image(s) Above Signature Tag Marker Image

Again, in complex documents determining the proximate text image to a signature location can require application of processing rules. For example, if a single text image 122 is identified as above a signature tag marker image 126 on a selected page of the original pdf image 110 then the text image 122 is identified as proximate. If multiple text images 122 are identified as above a signature tag marker image 126 on a selected page of the original PDF image 110 then the text image 122 closest to the signature tag marker image 126 is identified as proximate. If multiple text images 122 are identified as above a signature tag marker image 126 on a selected page of the original PDF image 110 and the text images 122 are the same distance to the signature text marker image 126 then identify the text image 122 furthest right as proximate.

Figure 4A:
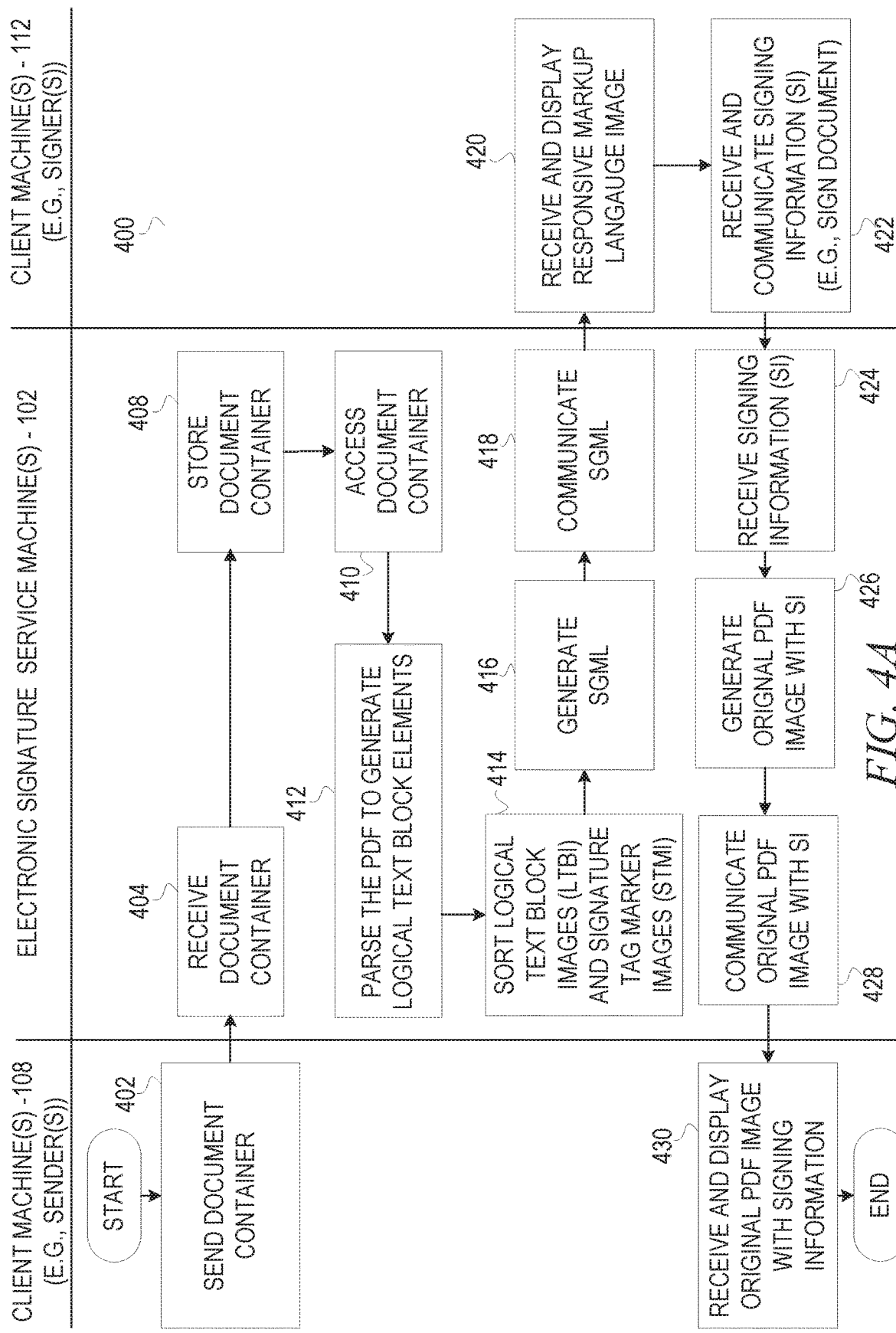
FIG. 4A is a block diagram illustrating a method to improve a technological process for signing documents, according to an embodiment.

FIG. 4A is a block diagram illustrating a method 400, according to an embodiment, to improve a technological process for signing documents. Illustrated on the left is a client machine 108 operated by a sender. Illustrated in the middle is an electronic signature service machine 102. Illustrated on the right is a client machine 112 operated by a signer. It will be appreciated that other embodiments of the method 400 may include one or more client machines 108 being operated by one or more senders, one or more electronic signature service machines 102, and one or more client machines 112 being operated by one or more signers.

The method 400 may commence, at operation 402, with the client machine 108 communicating a document container 104, over a network 106, to the electronic signature service machine 102. For example, the document container 104 may include a PDF 114 in the form of a commercial lease, signature tag marker elements 111 that were positioned over the PDF 114 for receiving signing information, and screen size information 134 describing the screen electronically coupled to the client machine 108. In other embodiments, the screen size information 134 may further include screen size information 134 describing the screens electronically coupled to the client machine 112.

At operation 404, at the electronic signature service machine 102, the receiving module 118 may receive the document container 104 and, at operation 408, the processing module 120 may store the document container 104 in the database 107.

At operation 410, the processing module 120 may access the document container 104. Recall that the document container 104 may be utilized for rendering an original PDF image 110 in page format 300 or a responsive markup language image 131 in responsive format 302.

At operation 412, the processing module 120 may parse the PDF 114 to extract a set of original document elements 146 (e.g., text elements) from the original document elements 146 and generate logical text block elements 180. For example, the processing module 120 may extract original document elements 146 that are utilized for generating text images 122 thereby ignoring other original document elements 146 (e.g., for generating table images 124 or other images) and utilize the extracted original document element 146 (e.g., text elements) to generate a logical text block element 180 for each original document element 146 that was extracted.

At operation 414, the processing module 120 sorts signature tag marker images 126. For example, the processing module 120 may utilize a method to sort visual elements, as illustrated in FIGS. 4B-4E. Returning to FIG. 4A, the processing module 120 may utilize the method to sort each text image 122 against each signature tag marker image 126 until the signature tag marker element information 116 is exhausted. The processing module 120 utilizes the method to pair each signature tag marker image 126 on a page with the text images 122 on the page. The processing module 120 pairs a signature tag marker image 126 on a page to the closest text image 122 on the page. Recall that a signature tag marker image 126 corresponds to a signature tag marker element 117 and a text image 122 corresponds to a logical text block element 180.

At operation 416, the processing module 120 generates markup language information (e.g., special generalized markup language (SGML)) including markup language statements. The processing module 120 may generate the markup language statements based on the signature tag marker elements 111, the logical text block elements 180, and the proximities associated with corresponding signature tag marker images 126 and text images 122. The SGML may include Hypertext Markup Language statements and Cascading Style Sheets. In addition, the processing module 120 may generate multiple sets of markup language information with each set based on screen size information 134 describing a screen size for a target client machine (e.g., client machine 108, client machine 112, etc.). For example, a screen size associated with a desktop computer may be larger than a screen size associated with a tablet (e.g., iPad®) that is larger than a screen size associated with a mobile device (e.g., iPhone®).

At operation 418, the processing module 120 communicates the markup language information (e.g., SGML), over the network 106, to the client machine 112 for rendering a responsive markup language image 131 on the client machine 112. According to one embodiment, the processing module 120 may select the appropriate set of markup language information based on screen size information 134 associated with the client machine 112. The screen size information 134 may have been received in a previous communication received from the client machine 112.

At operation 420, the client machine 112 receives the markup language information and renders a responsive markup language image 131 on the screen of the client machine 112 based on the markup language information. According to one embodiment, multiple sets of markup language information (e.g., generated for different size screens) are received by the client machine 112 that, in turn, selects the appropriate set for rendering on a screen electronically coupled to the client machine 112. The responsive markup language information may include SGML statements that were generated by the electronic signature service machine 102 and rendered by the client machine 112 such that each signature tag marker image 126 is positioned in the responsive markup language image 131 below a text image 122 identified as "closest" (proximate) in the original PDF image 110, as identified at operation 414.

At operation 422, the client machine 112 may receive signing information and communicate the signing information over the network 106 to the electronic signature service machine 102. The client machine 112 may communicate the signing information in association with signature tag marker identifier information 176 including one or more signature tag marker identifiers. For example, the client machine 112 may receive a signature, an approval, a date, or some other type of signing information from the signer and communicate the signing information being received in association with a corresponding signature tag marker identifier identifying each of the signature, the approval, the date, or some other type of signing information.

At operation 424, the electronic signature service machine 102 may receive the signing information 178 in association with one or more corresponding signature tag marker identifiers. At operation 426, the electronic signature service machine 102 may generate the original PDF image 110 including the signing information 178. The electronic signature service machine 102 may position the signing information 178 at the appropriate signature tag marker image 126 in the original PDF image 110 based on the corresponding signature tag marker identifier.

At operation 428, electronic signature service machine 102 communicates the original PDF image 110 with the signing information 178, over the network 106, to the client machine 108. The original PDF image 110 and the signing information 178 are communicated for rendering on the client device 108, 112 in page format 300 to improve the technological process for signing documents.

In the above embodiment, the signing information 178 was applied to the responsive markup language image 131. In another embodiment, the signing information 178 may be applied to the original PDF image 110. For example, the signing information 178 may be applied by the signer to the original PDF image 110 after a presentation of visual elements for viewing by the signer in a responsive markup language image 131 and as a final step 430 in a work flow. Particularly in situations where legal requirements dictate a signature on the document in the original format (e.g., original PDF image 110), the latter process can be invoked to solve the review problem with original documents on a mobile device, but still meeting legal requirements for application of signatures to the original (or a representation of the original) document (e.g., original PDF image 110).

Figure 4B:
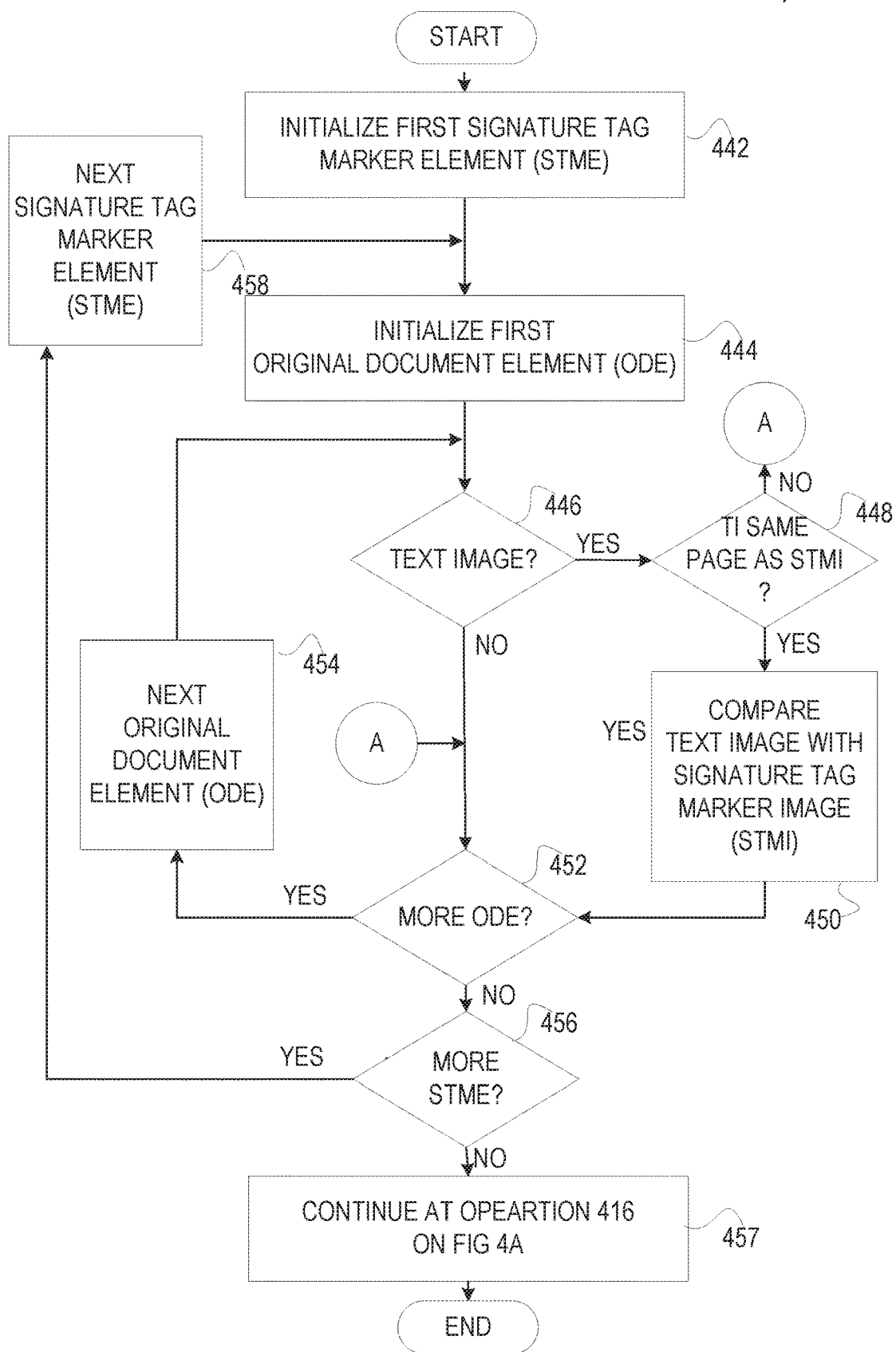
FIG. 4B is a block diagram illustrating a method to sort visual elements, according to an embodiment.

FIG. 4B is a block diagram illustrating a method 414, according to an embodiment, to sort visual elements. The method 414 corresponds to the processing being described in operation 414 in FIG. 4A. Returning to FIG. 4B, at operation 442, the processing module 120 registers, as current, the first signature tag marker element 117 from the signature tag marker element information 116. At operation 444, the processing module 120 registers, as current, the first original document element 146 in the original document element information 132. Recall that a signature tag marker element 117 corresponds to a signature tag marker image 126 and an original document element 146 corresponds to an original document element image 149.

At decision operation 446, the processing module 120 identifies whether the original document element image 149 registered as current is a text image 122. If the original document element 146 registered as current is a text image 122 then processing continues at decision operation 448. Otherwise, processing continues at decision operation 452.

At decision operation 448, the processing module 120 identifies whether the text image 122 registered as current is on the same page of the original PDF image 110 as the signature tag marker image 126 registered as current. If the text image 122 registered as current is on the same page of the original PDF image 110 as the signature tag marker image 126 registered as current then a branch is made to operation 450. Otherwise, a branch is made to decision operation 452.

At operation 450, the processing module 120 may compare the text image 122 registered as current with the signature tag marker image 126 registered as current (e.g., see method 450 in FIG. 4C).

At decision operation 452, the processing module 120 determines whether there are more original document elements 146 in the original document element information 132. If there are more original document elements 146 in the original document element information 132 then a branch is made to operation 458. Otherwise, a branch is made to decision operation 456.

At operation 454, the processing module 120 advances to the next original document element 146 in the original document element information 132. For example, the processing module 120 may make a breadth first traversal of the PDF 114 examining each of the original document elements 146 in the original document element information 132 and advancing to the next original document elements 146 making it the original document element 146 that is current.

At decision operation 456, the processing module 120 determines whether there are more signature tag marker elements 148 in the signature tag marker element information 116. If there are more signature tag marker elements 148 in the signature tag marker element information 116 then a branch is made to operation 458.

At operation 458, the processing module 120 advances to the next signature tag marker element 117 in the signature tag marker element information 116. For example, the processing module 120 may advance to the next signature tag marker element 117 in the signature tag marker element information making it the signature tag marker element 117 that is current.

At operation 457, the processing module 120 may continue processing at operation 416 on FIG. 4A while processing, as illustrated on FIG. 4B, ends.

FIG. 4C is a block diagram illustrating a method 450, according to an embodiment, to identify a position of a text image 122. The method 450 describes operations corresponding to operation 450 on FIG. 4B, according to an embodiment. The method 450 commences at decision operation 453, at the electronic signature service machine 102, with the processing module 120 identifying whether the text image 122 vertically overlaps ("Y axis") the signature tag marker image 126. For example, pixels may be compared to identify whether they are overlapping. If the text image 122 vertically overlaps the signature tag marker image 126 then a branch is made to decision operation 455. Otherwise, a branch is made to decision operation 462.

At decision operation 455, the processing module 120 identifies whether the text image 122 is left of signature tag marker image 126. If the text image 122 is left of the signature tag marker image 126 then a branch is made to decision operation 459. Otherwise, a branch is made to operation 469.

At decision operation 459, the processing module 120 identifies whether a previously processed text image 122 stored in "BEST VERTICAL OVERLAP" (not the text image 122 that is current) was identified as vertically overlapping ("Y axis") the signature tag marker image 122. If a previously processed text image 122 (e.g., stored as "BEST VERTICAL OVERLAP") is identified as vertically overlapping ("Y axis") the signature tag marker image 126 that is current then a branch is made to operation 458. Otherwise, a branch is made to operation 460.

Figure 4D:
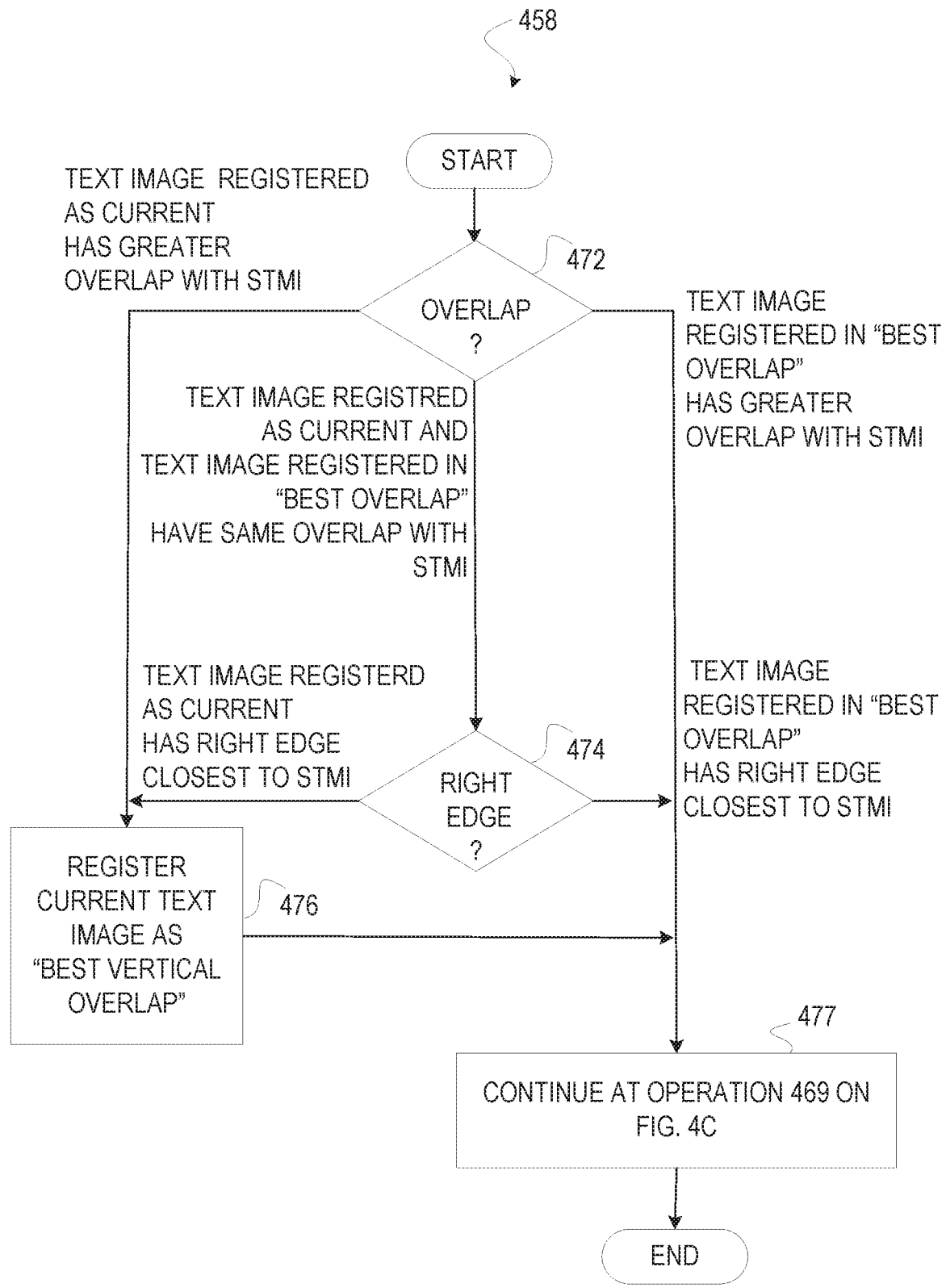
FIG. 4D is a block diagram illustrating a method to identify a best way of overlapping text and an image, according to an embodiment.

At operation 458, the processing module 120 processes the text image 122 registered as current and identified as vertically overlapping the signature tag marker image 126 with a text image 122 previously identified as vertically overlapping the signature tag marker image 126 (e.g., see method 458 in FIG. 4D).

At operation 460, the processing module 120 stores an order identifier corresponding to the logical text block element 180 corresponding to the text image 122 that is current in the storage location "BEST VERTICAL OVERLAP."

At decision operation 462, the processing module 120 identifies whether the text image 122 registered as current is located above the signature tag marker image 126 in the original PDF image 110. If the text image 122 registered as current is located above the signature tag marker image 126 in the original PDF image 110 then a branch is made to decision operation 464. Otherwise processing continues at operation 469.

At decision operation 464, the processing module 120 identifies whether a previously processed text image 122 stored in "BEST ABOVE" (not the text image 122 that is current) was identified as above ("Y axis") the signature tag marker image 126 registered as current. If the previously processed text image 122 stored in "BEST ABOVE" is identified as above ("Y axis") the signature tag marker image 126 then a branch is made to operation 468. Otherwise, a branch is made to operation 466.

At operation 466, the processing module 120 stores order identifier information 196 (e.g., logical text block order identifier) corresponding to the text image 122 registered as current in the storage location "BEST ABOVE." For example, the logical text block order identifier stored identifies the logical text block element 180 corresponding to the text image 122 registered as current.

Figure 4E:
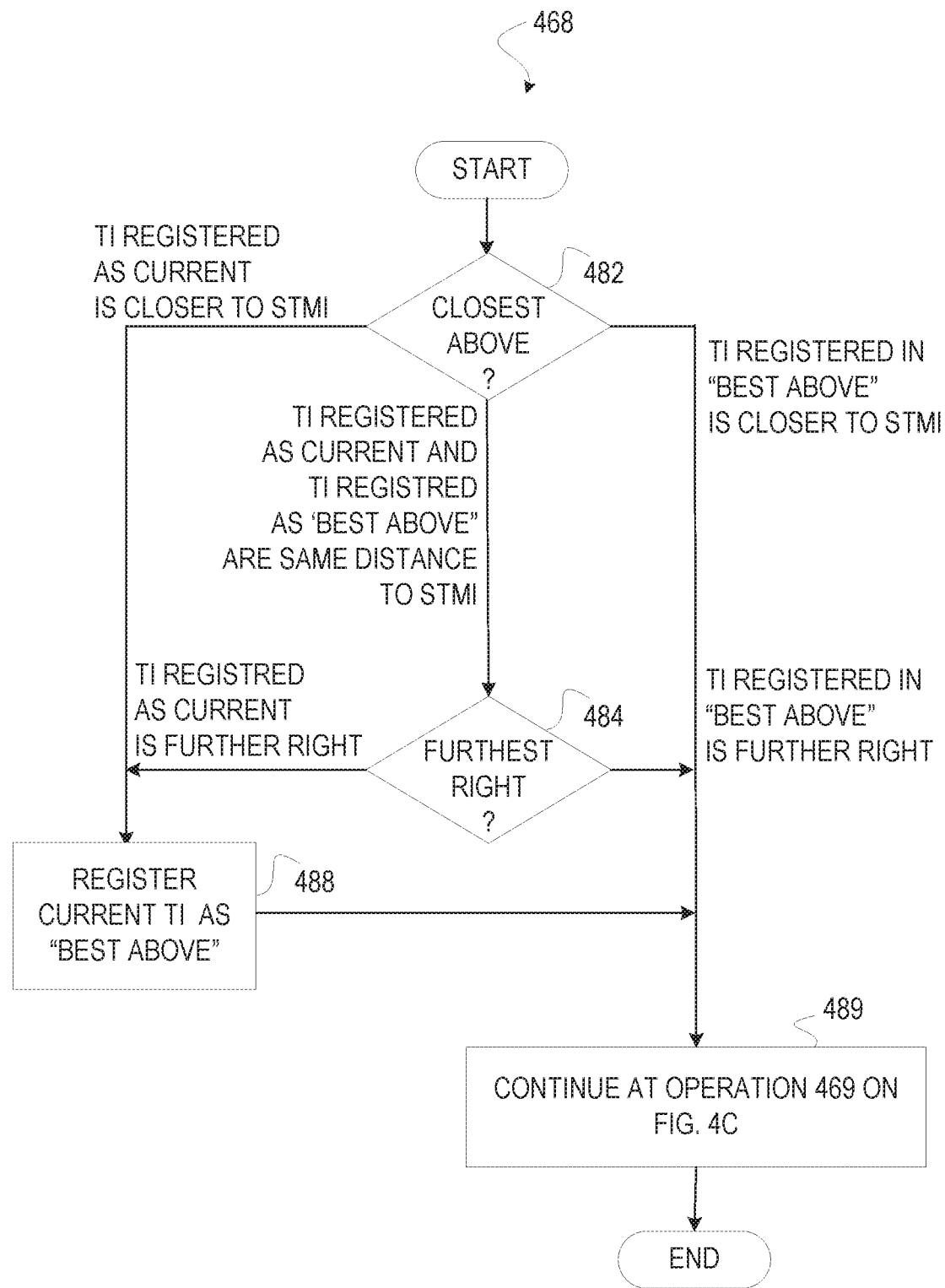
FIG. 4E is a block diagram illustrating a method to identify best above text image, according to an embodiment.

At operation 468, the processing module 120 further processes the text image 122 registered as current and identified as above and right of the signature text marker image 126 identified as current (e.g., see method 468 in FIG. 4E).

At operation 469, the processing module 120 continues processing at decision operation 452 on FIG. 4B while processing, as illustrated on FIG. 4C, ends.

FIG. 4D is a block diagram illustrating a method 458, according to an embodiment, to identify a best overlapping text image 122, according to an embodiment. The method 458 describes operations corresponding to operation 458 on FIG. 4C, according to an embodiment. The method 458 commences at decision operation 472 with the processing module 120 identifying whether the text image 122 registered as current has a greater overlap with the signature text marker image 126 than the text image 122 stored in "BEST VERTICAL OVERLAP." For example, the number of overlapping pixels for each of the images may be counted and compared. In another example, a measurement of images may be compared. If the text image 122 registered as current has a greater overlap with the signature text marker image 126 than the text image 122 stored in "BEST VERTICAL OVERLAP" then a branch is made to operation 476. If the text image 122 registered in the storage location "BEST VERTICAL OVERLAP" has a greater overlap with the signature text marker image 126 than the text image 122 registered as current then processing continues at operation 477. If the text image 122 registered in the storage location "BEST VERTICAL OVERLAP" has the same overlap with the signature text marker image 126 as the text image 122 registered as current then a branch is made to decision operation 474.

At decision operation 474, the processing module 120 identifies whether the text image 122 registered as current has a right edge that is closer to the signature text marker image 126 than the right edge of the text image 122 that is stored in "BEST VERTICAL OVERLAP." If the text image 122 registered as current has a right edge that is closer to the signature text marker image 126 than the right edge of the text image 122 that is stored in "BEST VERTICAL OVERLAP" then a branch is made to operation 476. Otherwise a branch is made to operation 477.

At operation 476, the processing module 120 stores the order identifier information 196 (e.g., logical text block order identifier) corresponding to the text image 122 registered as current in "BEST VERTICAL OVERLAP."

At operation 477, the processing module 120 continues processing at operation 469 on FIG. 4C while processing, as illustrated on FIG. 4D, ends.

FIG. 4E is a block diagram illustrating a method 468, according to an embodiment, to identify best above text image 122. The method 468 describes operations corresponding to operation 468 on FIG. 4C, according to an embodiment. The method 468 commences at decision operation 482 with the processing module 120 identifying whether the text image 122 registered as current is closer to the signature text marker image 126 than the text image 122 identified based on the storage location for "BEST ABOVE." If the text image 122 registered as current is closer to the signature text marker image 126 than a text image 122 identified based on the storage location "BEST ABOVE" then a branch is made to operation 488. If the text image 122 identified based on the storage location "BEST ABOVE" is closer to the signature text marker image 126 than the text image 122 registered as current then processing continues at operation 489. If the text image 122 identified based on the storage location "BEST ABOVE" and the text image 122 registered as current are the same distance to the signature text marker image 126 then a branch is made to decision operation 484.

At decision operation 484, the processing module 120 identifies whether the text image 122 registered as current has a right edge further right than the text image 122 identified based on the storage location "BEST ABOVE." If the text image 122 registered as current is further right than the text image 122 identified based on "BEST ABOVE" then a branch is made to operation 488. If the text image 122 identified based on the storage location "BEST ABOVE" is further right than the text image 122 registered as current then processing continues at operation 489.

At operation 489, the processing continues processing at operation 469 in FIG. 4C while processing, as illustrated on FIG. 4E, ends.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 106 (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in the present application are implemented, in some embodiments, in the context of a machine and an associated software architecture. The sections below describe representative software architecture(s) and machine (e.g., hardware) architecture that are suitable for use with the disclosed embodiments.

Figure 5:
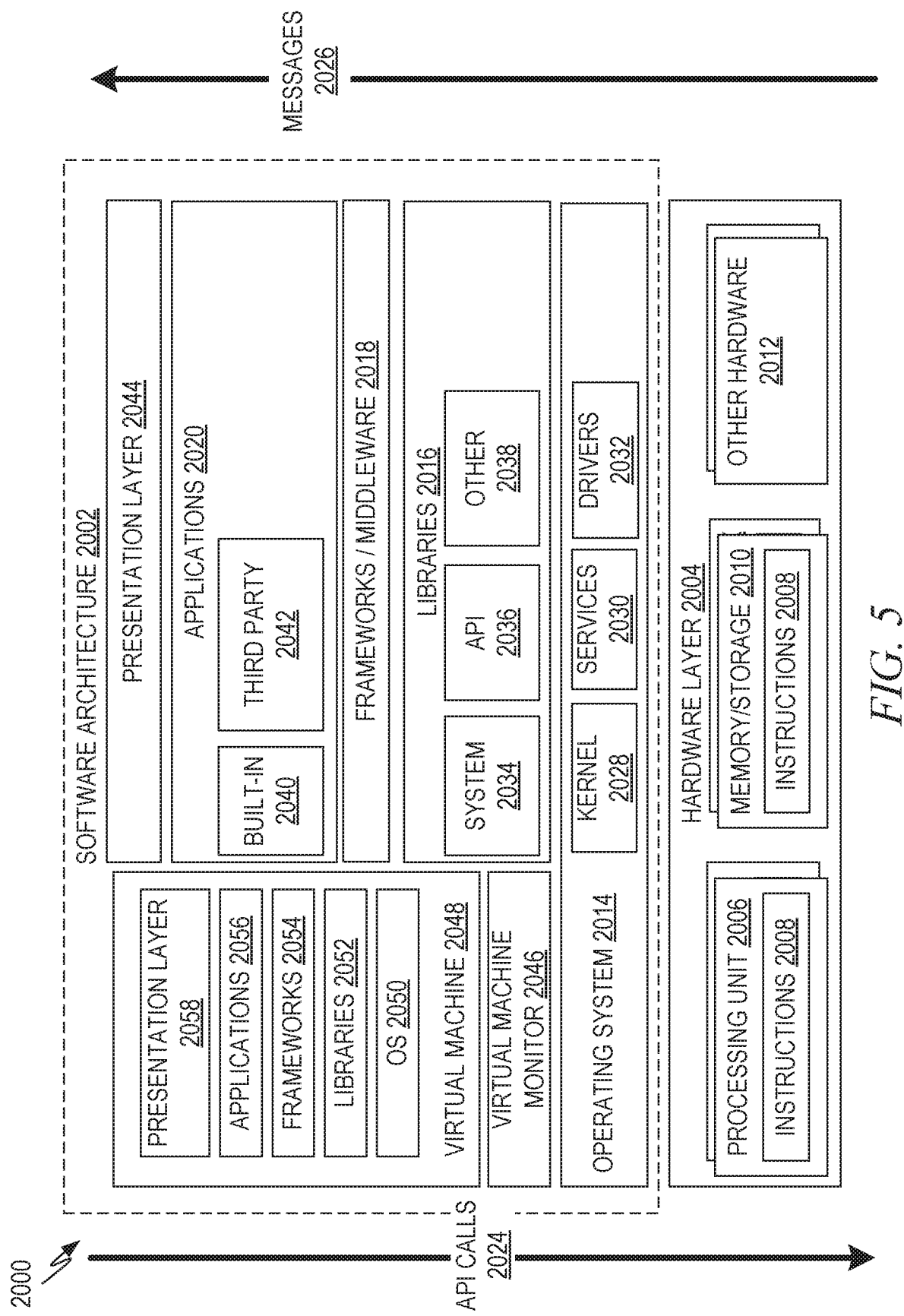
FIG. 5 is a block diagram illustrating a software architecture, according to an embodiment.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of things," while yet another combination produces a server computer for use within a cloud computing architecture. Not all combinations of such software and hardware architectures are presented here as those of skill in the art can readily understand how to implement the subject matter of the disclosure in different contexts from the disclosure contained herein. SOFTWARE ARCHITECTURE FIG. 5 is a block diagram 2000 illustrating a representative software architecture 2002, which may be used in conjunction with various hardware architectures herein described. FIG. 5 is merely a non-limiting example of a software architecture and it will be appreciated that many other architectures may be implemented to facilitate the functionality described herein. The software architecture 2002 may be executing on hardware such as machine 2100 of FIG. 6 that includes, among other things, processors 2110, memory/storage 2130, and input/output (I/O) components 2150. A representative hardware layer 2004 is illustrated and can represent, for example, the machine 2100 of FIG. 6. The representative hardware layer 2004 comprises one or more processing units 2006 having associated executable instructions 2008. Executable instructions 2008 represent the executable instructions 2008 of the software architecture 2002, including implementation of the methods and modules in the present application. Hardware layer 2004 also includes memory and/or storage modules 2010, which also have executable instructions 2008. Hardware layer 2004 may also comprise other hardware 2012, which represents any other hardware of the hardware layer 2004, such as the other hardware illustrated as part of machine 2100.

In the example architecture of FIG. 5, the software architecture 2002 may be conceptualized as a stack of layers where each layer provides particular functionality. For example, the software architecture 2002 may include layers such as an operating system 2014, libraries 2016, frameworks/middleware 2018, applications 2020, and presentation layer 2044. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as Moving Picture Experts Group 4 (MPEG4), MP3, Joint Photographic Experts Group (JPG), Portable Network Graphics)PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules, as described herein.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042 and/or applications or modules executing on an electronic signature service machine 102 and the like. Examples of representative built-in applications 2040 may include, but are not limited to, a contacts application, a browser application, a book reader application, a location application, a media application, a messaging application, and/or a game application. Third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™ Android™, Windows® Phone, or other mobile operating systems. In this example, the third-party application 2042 may invoke the API calls 2024 provided by the mobile operating system such as operating system 2014 to facilitate functionality described herein.

The applications 2020 may utilize built-in operating system functions (e.g., kernel 2028, services 2030 and/or drivers 2032), libraries (e.g., system libraries 2034, API libraries 2036, and other libraries 2038), frameworks/middleware 2018 to create user interfaces to interact with users of the system. Alternatively, or additionally, in some systems, interactions with a user may occur through a presentation layer, such as presentation layer 2044. In these systems, the application/module "logic" can be separated from the aspects of the application/module that interact with a user.

Some software architectures utilize virtual machines. In the example of FIG. 5, this is illustrated by virtual machine 2048. A virtual machine 2048 creates a software environment where applications 2020/modules can execute as if they were executing on a hardware machine (such as the machine 2100 of FIG. 6, for example). A virtual machine 2048 is hosted by a host operating system (operating system 2014 in FIG. 5) and typically, although not always, has a virtual machine monitor 2046, which manages the operation of the virtual machine 2048 as well as the interface with the host operating system (i.e., operating system 2014). A software architecture executes within the virtual machine 2048 such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 6:
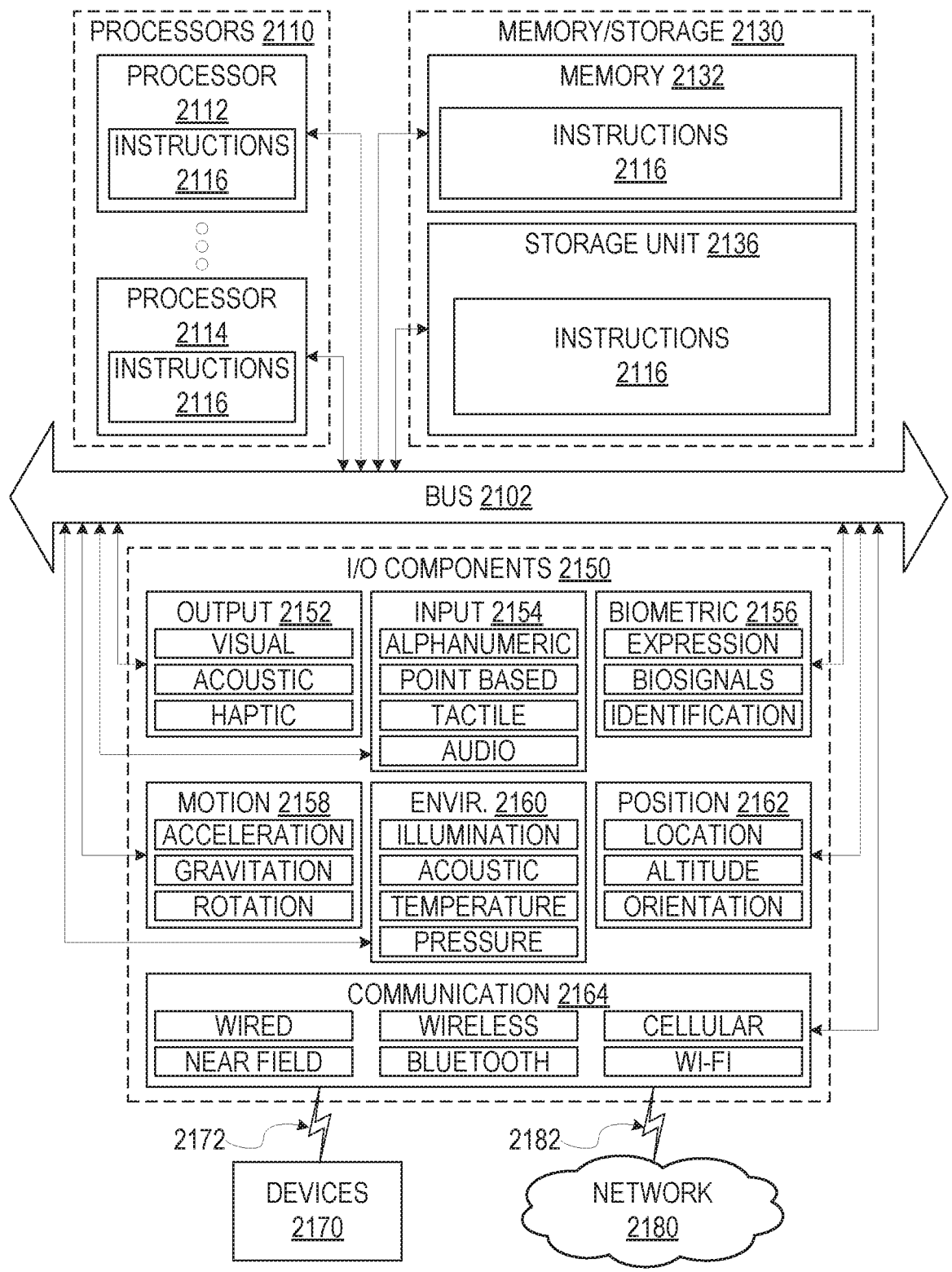
FIG. 6 is a block diagram of a machine in an example form of a computing system within which a set of instructions for causing the machine to perform any one or more of the methodologies discussed herein may be executed.

FIG. 6 is a block diagram illustrating components of a machine 2100, according to some example embodiments, able to read instructions 2116 from a machine-readable medium (e.g., a machine-readable storage medium) and perform any one or more of the methodologies discussed herein. Specifically, FIG. 6 shows a diagrammatic representation of the machine 2100 in the example form of a computer system, within which instructions 2116 (e.g., software, a program, an application 2020, an applet, an app, or other executable code) for causing the machine 2100 to perform any one or more of the methodologies discussed herein may be executed. For example, the instructions 2116 may cause the machine 2100 to execute the flow diagrams of FIG. 4A through FIG. 4E. Additionally, or alternatively, the instructions 2116 may implement the system 100 of FIG. 1A, the architecture 1100 of FIG. 5, and so forth. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine 108, 112 in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, processor 2112 and processor 2114 that may execute instructions 2116. The term "processor" is intended to include a multi-core processor 2110 that may comprise two or more independent processors 2112, 2114 (sometimes referred to as "cores") that may execute instructions 2116 contemporaneously. Although FIG. 6 shows multiple processors 2112, 2114, the machine 2100 may include a single processor 2112 with a single core, a single processor 2112 with multiple cores (e.g., a multi-core processor), multiple processors 2112, 2114 with a single core, multiple processors 2112, 2114 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine 2100. For example, portable machines such as mobile phones will likely include a touch input device or other such input mechanisms, while a headless server machine will likely not include such a touch input device. It will be appreciated that the/O components 2150 may include many other components that are not shown in FIG. 6. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as UPC bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

We claim:

1. A system for digitally signing documents, the system comprising:
   a hardware processor; and
   a non-transitory computer-readable storage medium storing executable instructions that, when executed by the hardware processor, cause the hardware processor to perform steps comprising:
      accessing a digital document in a first format and including at least a first signature tag marker element and a first logical text block element within a threshold proximity of the first signature tag marker element;
      generating markup language information based on a proximity of the first signature tag marker element to the first logical text block element for use in rending the digital document in a second format;
      in response to the digital document being partially rendered on a mobile device in the second format using the generated markup language, receiving signature information associated with a user of the client device based on a request by the user input via the mobile device to sign the digital document via the first signature tag marker element; and providing the digital document in the first format and the signature information to the mobile device for display, the display of the digital document including a rendering of the signature information in conjunction with a rendering of the first signature tag marker element.

2. The system of claim 1, wherein the first signature tag marker element includes first signature geometric information describing a rendering of the first signature tag marker element in the digital document in the first format.

3. The system of claim 2, wherein the first logical text block element includes first logical text block geometric information describing a rendering of the first logical text block element in the digital document in the first format.

4. The system of claim 3, wherein the markup language describes the proximity of the first signature tag marker element to the first logical text block element such that the client device, when rendering the digital document in the second format, renders the first signature tag marker element and the first logical text block element based on the described proximity.

5. The system of claim 1, wherein the received signature information describes a location for signature placement relative to the first signature tag marker element.

6. The system of claim 1, wherein the first format comprises the portable document format (PDF) and wherein the second format comprises the hypertext markup language (HTML).

7. The system of claim 6, wherein the second format further comprises cascading style sheets (CSS) that describes a presentation of visual user interface elements of the HTML.

8. A method for digitally signing documents, the method comprising:

accessing a digital document in a first format and including at least a first signature tag marker element and a first logical text block element within a threshold proximity of the first signature tag marker element;

generating markup language information based on a proximity of the first signature tag marker element to the first logical text block element for use in rendering the digital document in a second format;

in response to the digital document being partially rendered on a mobile device in the second format using the generated markup language, receiving signature information associated with a user of the client device based on a request by the user input via the mobile device to sign the digital document via the first signature tag marker element; and providing the digital document in the first format and the signature information to the mobile device for display, the display of the digital document including a rendering of the signature information in conjunction with a rendering of the first signature tag marker element.

9. The method of claim 8, wherein the first signature tag marker element includes first signature geometric information describing a rendering of the first signature tag marker element in the digital document in the first format.

10. The method of claim 9, wherein the first logical text block element includes first logical text block geometric information describing a rendering of the first logical text block element in the digital document in the first format.

11. The method of claim 10, wherein the markup language describes the proximity of the first signature tag marker element to the first logical text block element such that the client device, when rendering the digital document in the second format, renders the first signature tag marker element and the first logical text block element based on the described proximity.

12. The method of claim 8, wherein the received signature information describes a location for signature placement relative to the first signature tag marker element.

13. The method of claim 8, wherein the first format comprises the portable document format (PDF) and wherein the second format comprises the hypertext markup language (HTML).

14. The method of claim 13, wherein the second format further comprises cascading style sheets (CSS) that describes a presentation of visual user interface elements of the HTML.

15. A non-transitory computer-readable storage medium storing executable instructions for digitally signing documents, the instructions, when executed by a hardware processor, configured to cause the hardware processor to perform steps comprising:

accessing a digital document in a first format and including at least a first signature tag marker element and a first logical text block element within a threshold proximity of the first signature tag marker element;

generating markup language information based on a proximity of the first signature tag marker element to the first logical text block element for use in rendering the digital document in a second format;

in response to the digital document being partially rendered on a mobile device in the second format using the generated markup language, receiving signature information associated with a user of the client device based on a request by the user input via the mobile device to sign the digital document via the first signature tag marker element; and providing the digital document in the first format and the signature information to the mobile device for display, the display of the digital document including a rendering of the signature information in conjunction with a rendering of the first signature tag marker element.

16. The non-transitory computer-readable storage medium of claim 15, wherein the first signature tag marker element includes first signature geometric information describing a rendering of the first signature tag marker element in the digital document in the first format.

17. The non-transitory computer-readable storage medium of claim 16, wherein the first logical text block element includes first logical text block geometric information describing a rendering of the first logical text block element in the digital document in the first format.

18. The non-transitory computer-readable storage medium of claim 17, wherein the markup language describes the proximity of the first signature tag marker element to the first logical text block element such that the client device, when rendering the digital document in the second format, renders the first signature tag marker element and the first logical text block element based on the described proximity.

19. The non-transitory computer-readable storage medium of claim 15, wherein the received signature information describes a location for signature placement relative to the first signature tag marker element.

20. The non-transitory computer-readable storage medium of claim 15, wherein the first format comprises the portable document format (PDF) and wherein the second format comprises the hypertext markup language (HTML) and cascading style sheets (CSS).

* * * * *